(12) United States Patent
La Salle

(10) Patent No.: US 11,645,632 B2
(45) Date of Patent: May 9, 2023

(54) SYSTEM AND METHOD FOR A DECENTRALIZED PORTABLE INFORMATION CONTAINER SUPPORTING PRIVACY PROTECTED DIGITAL INFORMATION CREDENTIALING, REMOTE ADMINISTRATION, LOCAL VALIDATION, ACCESS CONTROL AND REMOTE INSTRUCTION SIGNALING UTILIZING BLOCKCHAIN DISTRIBUTED LEDGER AND CONTAINER WALLET TECHNOLOGIES

(71) Applicant: Derek Norman La Salle, Kirkland, WA (US)

(72) Inventor: Derek Norman La Salle, Kirkland, WA (US)

( * ) Notice: Subject to any disclaimer, the term of this patent is extended or adjusted under 35 U.S.C. 154(b) by 213 days.

(21) Appl. No.: 16/882,744

(22) Filed: May 26, 2020

(65) Prior Publication Data

US 2021/0374693 A1 Dec. 2, 2021

(51) Int. Cl.
*G06Q 20/38* (2012.01)
*G06Q 20/06* (2012.01)
(Continued)

(52) U.S. Cl.
CPC ....... *G06Q 20/065* (2013.01); *G06Q 20/3678* (2013.01); *G06Q 20/3825* (2013.01);
(Continued)

(58) Field of Classification Search
CPC .......... G06Q 20/3678; G06Q 20/3825; G06Q 20/3829; G06Q 20/4014; G06Q 2220/00;
(Continued)

(56) References Cited

U.S. PATENT DOCUMENTS

2016/0260169 A1* 9/2016 Arnold et al. .......... G06Q 20/10
2018/0276666 A1* 9/2018 Haldenby et al. ..... G06Q 40/04
(Continued)

FOREIGN PATENT DOCUMENTS

FR WO2021059057 A1 * 9/2019
WO WO 2019072278 A2 * 9/2021 ............. G06F 21/62

*Primary Examiner* — Neha Patel
*Assistant Examiner* — Yin Y Choi

(57) ABSTRACT

A mechanism for verifying digital information provenance and attestation using blockchain distributed ledger technology which reveals unauthorized tampering with credentialed information. Content modifications are detectable leveraging only local edge validation supported by the normative Bitcoin Core cryptographic libraries or equivalent blockchain implementations. The invention prevents unauthorized access, unregulated copy distribution, and orphaned ownership lacking issuer provenance and attestation. The preferred embodiment provides tamper detectable digital content containers supporting credentialing, remote administration, localized validation, distributed access control, and processing instruction signaling. Intermediary third-party services are not required to verify provenance and issuer attestation. Blockchain integrated cryptographic information containers and administrative transactions immutably record the binding between participating parties (e.g., issuer, administrator, requestor) and associated digital assets (e.g., insurance card, medical records, driver's license, passport, biometric, business contract, software application files, data).

11 Claims, 10 Drawing Sheets

Figures 0, 1:
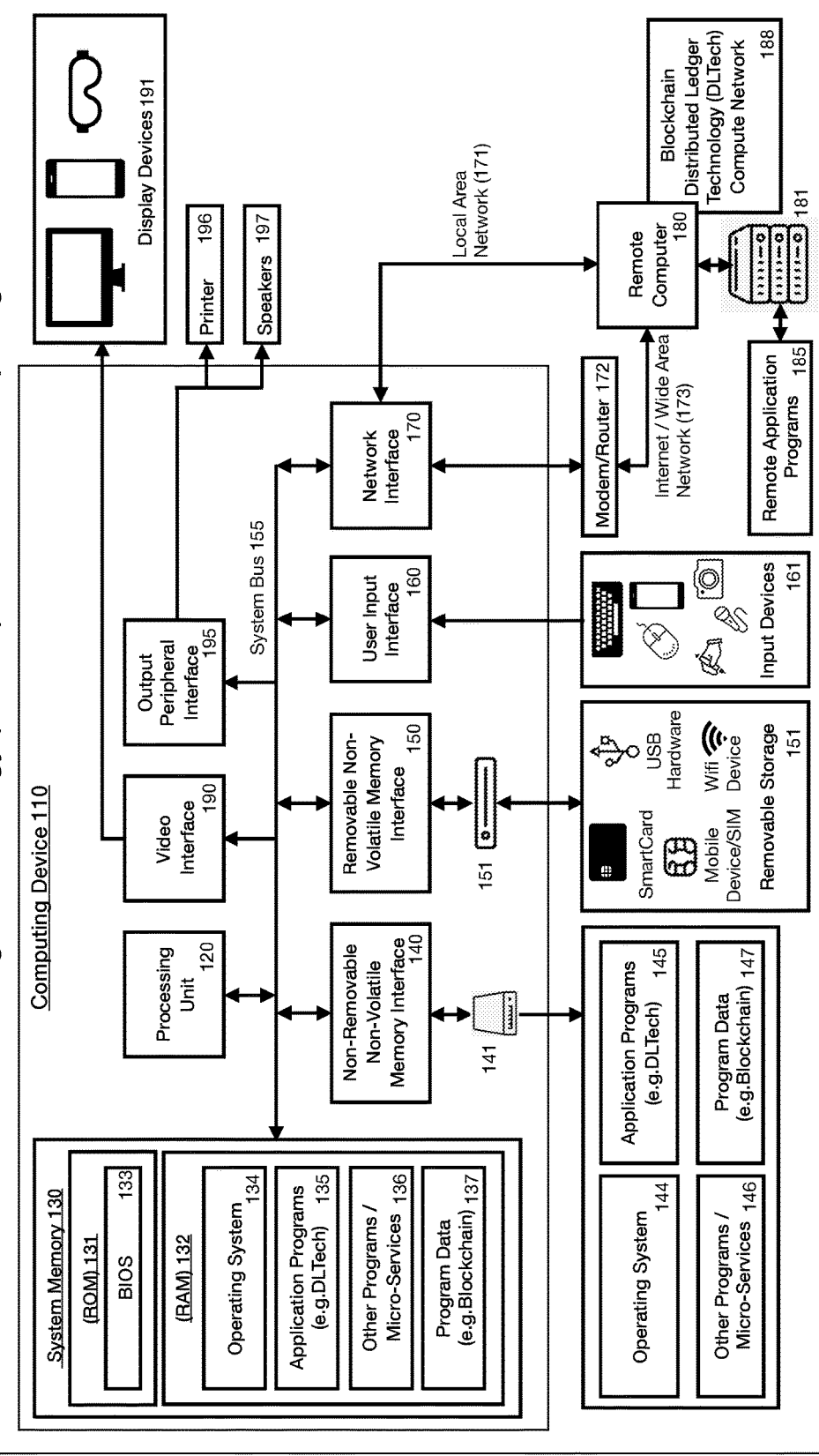

Exemplar Computing Environment Integrating Blockchain Distributed Ledger Technology (DLTech)

(51) Int. Cl.
  *G06Q 20/36* (2012.01)
  *H04L 9/08* (2006.01)
  *G06Q 20/40* (2012.01)
  *H04L 9/00* (2022.01)

(52) U.S. Cl.
  CPC ..... *G06Q 20/3829* (2013.01); *G06Q 20/4014* (2013.01); *H04L 9/0825* (2013.01); *G06Q 2220/00* (2013.01); *H04L 9/50* (2022.05); *H04L 2209/56* (2013.01)

(58) Field of Classification Search
  CPC ....... G06Q 20/065; H04L 9/0825; H04L 9/50; H04L 2209/56
  USPC .......................................................... 705/75
  See application file for complete search history.

(56) References Cited

U.S. PATENT DOCUMENTS

2019/0058604 A1\* 2/2019 Toll et al. ................ H04L 9/50
2021/0150044 A1\* 5/2021 Christofferson et al.
2022/0129893 A1\* 4/2022 Wright et al.

\* cited by examiner

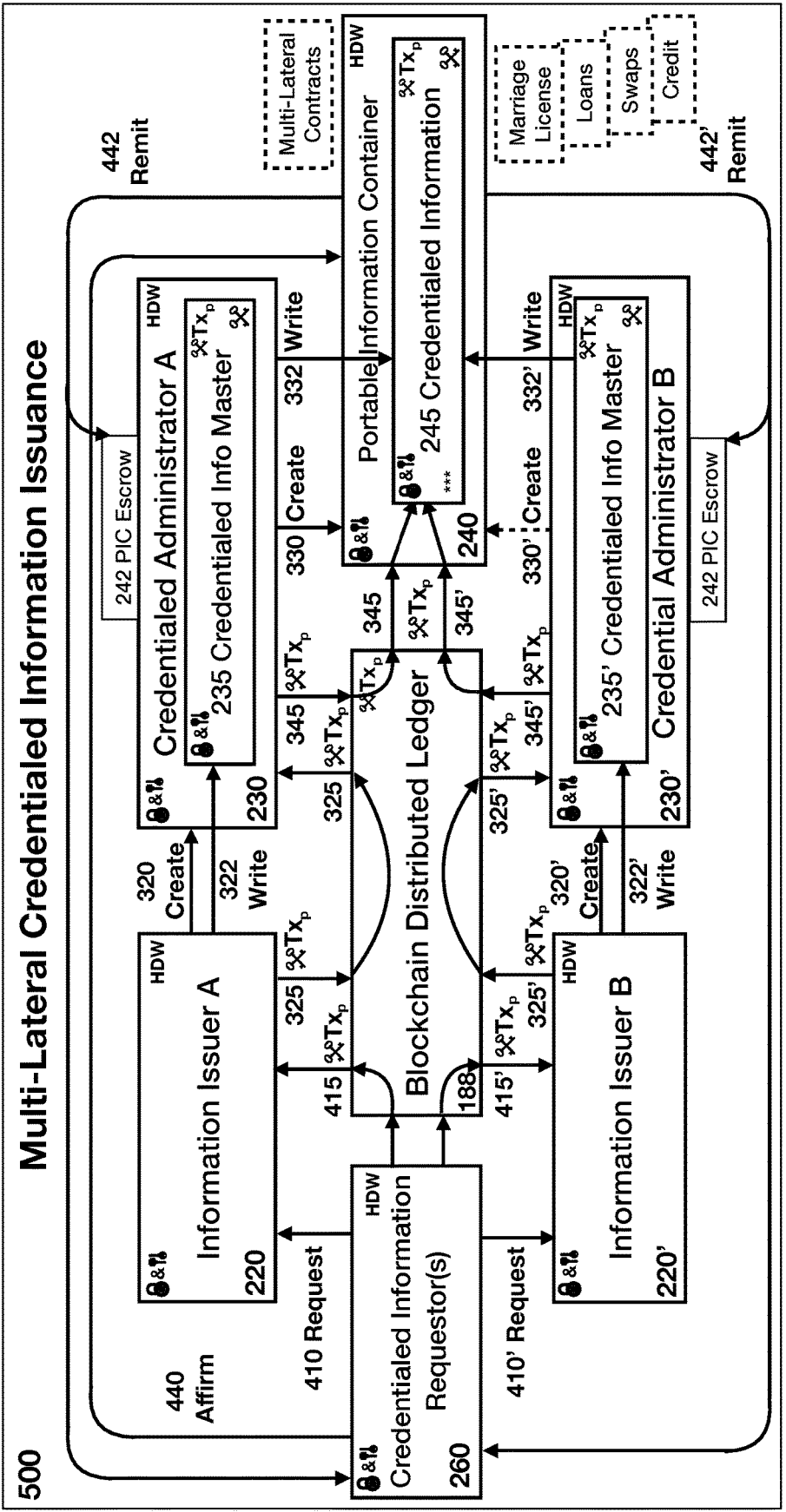
FIG. 5-O

SYSTEM AND METHOD FOR A DECENTRALIZED PORTABLE INFORMATION CONTAINER SUPPORTING PRIVACY PROTECTED DIGITAL INFORMATION CREDENTIALING, REMOTE ADMINISTRATION, LOCAL VALIDATION, ACCESS CONTROL AND REMOTE INSTRUCTION SIGNALING UTILIZING BLOCKCHAIN DISTRIBUTED LEDGER AND CONTAINER WALLET TECHNOLOGIES

A mechanism for privacy protected, portable and decentralized credentialed information issuance, lifecycle administration and access control supporting autonomously verifiable issuer attestation and provenance using blockchain distributed ledger technology. The embodied invention makes unauthorized tampering with credentialed information transparently detectable using local edge validation requiring only the execution of cryptographic libraries as found within the normative Bitcoin Core or equivalent blockchain implementation. The invention prevents unauthorized access, unregulated copy distribution, and orphaned ownership lacking issuer provenance as demonstrated in identity theft. The preferred embodiment provides the foundational capability of tamper resistant content leveraging modification detectable digital information credentialing, remote administration, localized independent state validation, distributed access control, metadata enrichment, application eventing and decentralized processing instruction signaling. The foundational aspect of the preferred embodiment directs authorized credentialed information issuers to persist, store and distribute information content hosted within cryptographically secure blockchain client "container-wallets".

As part of the preferred embodiment, the blockchain container-wallet serves as a portable, secure information host container and distributed access control gateway where one or more hosting container-wallet copies are distributed. The preferred embodiment depends solely upon the blockchain programmatic libraries supporting cryptographic operations, peer to peer state synchronization services and transaction posting functions for the proper operation of the invention. The credentialed information issuance protocol, system and method of the preferred embodiment eliminates the need for intermediary third party services to store and broker private data and keys. All participating entities and information content constituting secured digital assets with universally unique identities in the form of blockchain addresses created in the context of container-wallets. Information issuers and/or their administrative entities create, escrow and distribute blockchain container-wallet instances with information content which within itself may be the persisted information and/or a resolvable reference link to actual content. Administrative blockchain transactions immutably record the provenance binding between blockchain container-wallets representing participating parties (e.g. issuer, administrator, requestor) and relevant digital assets (e.g. insurance card, medical records, driver's license, passport, biometric, business contract, software application files, reference data, metadata).

An information issuer's credential administrator container-wallet generates a cryptographically derived and hence provably correlated target container-wallet instance in which to store resident or referenced information content. Immutably binding administrative blockchain provenance transactions are posted on a chosen baseline distributed ledger with originating input transactions from the information issuer's credential administrator container-wallet and output transactions sent to the target information content associated address within the hosting container-wallet. Blockchain administrative provenance transactions of the preferred embodiment serve as carriers of data in the form of attestation validation hash codes (e.g. HMAC: Hash based Message Authentication Code) supporting content integrity verification. The embedded hash code is generated by a hashing algorithm executed with the information content as input. The preferred embodiment provides for information content integrity verification by comparing the hash code within the posted blockchain provenance administrative transaction to the resultant information content hash code produced at the time of validation. As a function of the preferred embodiment, the blockchain administrative transactions may also post embedded application specific processing signals, content lifecycle administration, processing directives and/or metadata tagging targeting the destination blockchain address correlated with the information content's persisted location.

The embedded information content host container-wallet is essentially a file that may be encrypted using the issuer and/or their administrative container-wallet associated keys to further secure the container as whole. The private keys of each address associated with the information content within the container-wallet are protected by the native blockchain client pass phrase secured encryption function. As a result, the container-wallet stores as a unit both information content and its associated PKI public-private key pair used for identity, encryption, digital signatures and to establish secure communication channels. The container-wallet's portability of the preferred embodiment supports decentralized edge distribution, as well as, centralized storage underlying a brokering service interface (e.g. cloud micro-service) as a standardized construct securing information content and their associated cryptographic keys.

FIELD OF INVENTION

The present invention relates generally to the field of computing. More particularly, the invention provides a mechanism to ensure that portable credentialed information content is maintained in a known safe state. This mechanism is also utilized to validate the integrity of the credentialed information in a way that provides sufficient assurance of the information content's fidelity since credential issuance. This assurance of information integrity and fidelity, in turn, prevents the unintended misuse of undetected information content forgery by consuming persons, entities, and/or system processes. Furthermore, this mechanism provides for secure remote information content lifecycle administration by an authorized entity (e.g. the issuer and/or the holding requestor) supporting, but not limited to, suspension or permanent revocation of the portable information content credential. Leveraging the same blockchain administrative transaction carrier signal mechanism used for lifecycle administration of information content, application specific remote edge processing instruction signaling is propagated in a multicast manner across the blockchain network to the holder(s) of instances of the blockchain wallet containing the signaling transaction target address.

BACKGROUND OF THE INVENTION

Information security is a broad term which often encompasses many aspects of the information content from inception through its lifecycle of a status transitions including deprecation or deactivation which may revoke access. Most often, information comes into existence but rarely, if ever, ceases to exist. Information is often modified, hence lacking immutability by not retaining an audit or provenance as to the changes that have occurred nor by whom/what. In reality, information is never really modified but instead versioned in time and space as a mutation. Often, the original version of the information may be destroyed and therefore lost in time. As a purveyor or inspector of information presented by an unknown party, the verification as to the authenticity and validity of the information holds the utmost of importance.

Unauthorized copies and tampering of information content is rarely transparently detectable especially by end consumers. Moreover, there exist little to no support for identifying unauthorized information copies and deep fake forgeries especially at the local end user network edge. A solution is needed that prevents unauthorized access, unregulated copy distribution, and orphaned ownership lacking issuer provenance as demonstrated in identity theft. A technical solution is needed across many use case scenarios to provide the foundational capability of issuing tamper resistant content leveraging modification detectable digital information credentialing, lifetime remote administration, localized independent state validation, distributed access control, metadata enrichment, application eventing and decentralized processing instruction signaling. If already distributed information content is compromised or is prematurely made invalid (e.g. Stolen passport, newly versioned data set), there is need for remote administration to post a signal associated to that information content it's new status as de-activated or versioned. Such a signal must be available ubiquitously and immutably to all inspectors of the information content at the point of interaction even if disconnected. Registries and centralized digital rights management services introduce third party service and connectivity dependencies which may hamper civilization scale deployments.

Though public key infrastructure (PKI) supports adhoc application of digital signatures and content encryption, the onus is placed upon the practitioner to manage keys within their domain often separated from the associated information content and end user community. Such silo implementations leave systems vulnerable to inadvertent key expirations especially when implemented through centrally generated certificates by third parties. Crossing organization boundaries adds undue integration and communications burdens upon all parties especially in bi-lateral interactions. Even with centralized services to assist with these issues, fragility of additional dependencies arise and may preclude disconnected use case scenarios.

Verified chains of digital signatures with traceability to the authorized trusted information issuer provides a basic level of provenance and attestation as to the source of the credentialed information content. Implementing digital signature chain verification up to the issuing source can place a burden upon the validator to manage keys, their role based organizational relationships and their association to applicable information content. Often the need to manage Public Key Infrastructure ("PKI") credentials for provenance and attestation verification may preclude remote and portable edge validation especially for intermittently connected network edge scenarios (e.g. Lost or stolen digital identity of diaspora victims transiting remote locations lacking cloud service connectivity). The existing lack of decentralized credentialed information provenance and attestation protocol to ensure the unbroken lineage of information integrity during its lifetime maintains a fragile dependency upon intermediaries. The need for a single scalable system and method for safekeeping, access control, verification and administration of credentialed information content whether residing in centrally managed facilities (e.g. cloud microservices) or portably on the remote network edge (e.g. mobile device) has been demonstrated time and again especially in crisis plagued environments. Decentralized validation and authentication of the information content issuer's attestation will unleash the dependency bonds currently in practice. Support for information content fidelity and integrity verification on the network edge (i.e.—Internet) without a direct connection to the original information issuer or a proxy registry service is especially important in emerging markets where ubiquitous connectivity may not be pervasively available.

Exemplar Use Case Scenarios of Preferred Embodiment Applicability

There are extensive and numerous examples of issued or published credentialed information content requiring an ecosystem of common key components fulfilling necessary roles of the use case scenario solution. There is need for a common foundational architecture to support the many bespoke solutions offering repeatable design patterns which may be implemented across many applicable scenarios. An observed common pattern requires the implementation of participating entities in the information content issuance process. Implementations require distilled base framework constructs which may serve as the foundation for many solutions. The extensible nature of a repeatable framework does not limit the evolution over time of the technology stack comprising these foundational components.

Core information content issuance components representing role based participating entities are needed as foundational components upon which solutions derive and extend. Such common roles include, but not limited to, Information Issuance "Root Authority" (RA) which is known and trusted by the applicable community of information inspectors (e.g. government agency, top level corporate entity, standards body, etc.), the ("Credentialed Information Issuer") acting as a facilitating agent authorized by a Root Authority, the ("Credentialed Information Administrator") responsible for the creation, instance issuance, escrow and lifecycle administration of the information content, the ("Credentialed Information Validator") retaining the programmatic code or instruction set to verify the fidelity and integrity of the Credentialed Information provenance and issuer attestation and the ("Credentialed Information Requestor/Presenter") representing the ultimate holder of the Credentialed Information hosted within a Portable Information Container wallet if so solicited for remittance.

Credentialed Information encompasses all digital information and data including, but not limited to, linked references to remote or external content, structured data, semi-structured data, unstructured data, metadata, reference data, and multi-lateral business contracts. Many scenarios require the binding of idem potent entity identification information to business information especially where contractual terms and conditions are specified. Universally unique entity identification information is required to distinguish and reference all specific constructs in existence. Common identity constructs include, but is not limited to, legal entity and sovereign identities (e.g. driver's license, passport, social security/pension card, voter identity card, business charter/registration). One of many important scenarios addressed by the preferred embodiment of this invention is the Legal Entity Identification ("LEI") issuance and verification of persons or organizations which serves as a keystone upon which business interactions and contractual obligations build.

Further examples of credentialed information content addressed by the preferred embodiment include, though not limited to: biometric data, medical records, health insurance rider terms and conditions, auto insurance, intellectual property (patents, copyrights, trademarks, licenses, royalty stream digital currency collection), books, credit rating, accounting artifacts (e.g. GAAP/IFRS accounting general ledger and reporting), tax filing, financial services data (e.g. credit or debit card, investment grade securities, investment equity/stock certificate, bond, notes/convertibles, warrants, trades, cash flows, loans, bi-lateral derivatives/swaps contracts trading funds, goods and/or services between parties [listed and OTC], portfolio, ETF, baskets etc.), smart business contracts, supply chain inventory, purchase orders to invoices to payments to receivables, last/living will and testament, notarized documents, academic publications, research reports, test results, specifications, multi-media content preventing deep fake media forgery (e.g. publications, images, video, audio), insurance policies/cards, corporate identity badges, educational diplomas/certificates of completion, mapped interpretative taxonomies and ontologies, software program/system source code, intermediate language or compiled files, script, micro-services schema, application programming interfaces (API's)/functions, application execution containers (e.g. Docker or Kubernetes), games, access control policies/tickets/tokens (e.g. Kerberos tickets, X.509 certificates, oAuth, etc), processing rules, configuration, digital certificate, Domain Name Service (DNS) entry, Dynamic Host Configuration Protocol (DHCP) entry, Lightweight Directory Access Protocol (LDAP) entries, File System Map, or any information requiring managed credentialed curation with provenance and attestation verification of immutability.

Exemplar Credentialed Information Content Issuers

Examples for the contextual roles of credentialed information content issuers may include, but are not limited to: legal entities, persons, individual content producers and publishers, business organizations, social organizations, professional organizations, industry organizations, standards bodies, virtual organizations, self-organizing collectives, sovereign agencies, government agencies (e.g. national, state/province, county, city, region), jurisdictions, auditors, agents, collections, charitable foundations, utilities, authorities, corporations, subsidiaries, media production equipment, software application programs, application containers, application execution platforms (e.g. cloud service provider, data center), hardware, firmware, processes, cloud services, micro-services, machines, virtual machines, servers, Internet of Things (IoT) devices, mobile devices, appliances, cameras, signal processor recorders (audio, video, data), routers, repeaters, hubs, logging devices, meters, artificial intelligence services, or any other entity that creates, writes and/or publishes information requiring managed credentialed curation with immutable provenance and attestation to the issuer and root authority chain. In solicited credentialed information scenarios, examples of credentialed information requestors can be found amongst the aforementioned collection of credentialed information issuers.

Bilateral Verification of Credentialed Information Content Fidelity and Integrity in a Trust-Less Interaction Where engaging parties are anonymous, there may well be a requirement that all parties have been vetted and verified as authentic by a mutually trusted authority. Using credit to make a purchase is one of many examples requiring authorization and card holder attestation at a transaction level yet the card holder identity need not be revealed to the selling proprietor. As an inspector of information, a merchant does not necessarily always need to know the identification of the presenting party if the information has been attested as trustworthy and authentic by a provable trusted issuing party given an unambiguous and transparent provenance of the presented attestation credentials. The preferred embodiment adopts a "Trust-less" decentralized model eliminating dependencies on intermediary services. Though there are blockchain "smart contract" solutions available, they more oft than not depend upon a community of processing nodes and custom programming languages to implement support. Much of the world's business is centered around bi-lateral interactions where the contract between the parties is known only to them providing the desired information privacy. Businesses also need the ability to vet an unknown counter-party or requested digital artifact as authentic and originating from a known and trusted authority without requiring central registries operating beyond their control.

In view of the foregoing deficits in the prior art, a need for mechanisms to overcome the observed drawbacks is needed.

SUMMARY OF THE INVENTION

The present invention provides for the creation of blockchain container-wallet hosted, administered and gateway accessed credentialed information content securely stored on digital media (e.g. storage device, disk drive, portable device, smart card chip, etc.) in its verifiably original and unaltered form as digitally attested by the Information Issuer. The preferred embodiment implements a system and method of verifiable provenance and fidelity attestation by leveraging blockchain client wallet container inherent facilities of identity, Public Key Infrastructure (PKI) key management, content storage, and the ubiquitously available distributed transaction ledger. When persisted to digital media (e.g. computer hard disk, portable storage device, smart phone storage or smart card), credentialed information may be (optionally) encrypted using associated blockchain container wallet generated cryptographic keys to obfuscate the contents from unauthorized viewing until a time chosen explicitly by the "credentialed information presenter". The information content hash is recorded on the blockchain via an administrative transaction posted to the address where the information content or an external reference thereof is stored. This system and method ensures that upon inspection and validation, alterations of the information content as originally stored by the "Credentialed Information Issuer" are discoverable by a "Credentialed Information Validator".

The blockchain wallet serving as a portable information container host PKI key pairs at each generated resident child address. The PKI key pairs used to verify digitally signed information, encrypt/decrypt privacy protected information and establish secure communications channels must be safeguarded yet made readily available on demand for cryptographic operations. Blockchain wallet containers serve as a secure container key vault providing for storing any serialized information content associated with generated resident addresses having associated public/private key pairs. Credentialed information or remote references thereof are written to the blockchain wallet container file correlated to a specific PKI key pair derived address.

Information Content Provenance and Attestation

The preferred embodiment's layered approach implementing indisputable proof of provenance provides a "Credentialed Information Validator" with levels of strong yet transparent trustworthy credentialed information content validation without need of intermediary service providers. Explicitly by design, the preferred embodiment of this invention enables the participating parties to expressly engage in bilateral or multilateral interactions exchanging information between counter-parties based upon a delegated trust model. An entity may not know of nor trust a counter-party but will interact in discrete engagements if the counter-party is authorized and vetted, with presented attestation, by a common trusted authority.

As part of the preferred embodiment, all provenance attestation enhanced credentialed information validation instructions can execute on the edge of the network bilaterally between the engaging parties using only presented blockchain wallet container hosted credentialed information content, the ability to query the relevant blockchain distributed ledger verifying administrative provenance, attestation and processing instruction transactions, the Credentialed Information Issuer and their trusted parent Issuing Root Authority. As a common framework provided by the preferred embodiment, the entire chain of parties, information and associated processing instructions, including but not limited to validation micro-services are bound immutably by administrative provenance and attestation transactions posted to the blockchain distributed ledger. Further, the preferred embodiment leverages digital signatures on administrative transactions and credentialed information content. In order to maximize provenance key lineage capabilities, the preferred embodiment leverage Blockchain Hierarchical Deterministic Wallet (HDW) and key generation.

Blockchain Administrative Transaction as a Processing Instruction Signal Carrier As part of the preferred embodiment, blockchain "processing instruction signaling" transactions provide the needed provenance attestation chain required to establish trusted delegation from the information issuer to the information presenter as verified by the information validator. Because blockchain transactions are leveraged to establish provenance chains in addition to cryptographically verifiable HDW key lineage generation, these same transactions are ideally suited to also signal processing instructions as general purpose remote state change or execution directives. Digitally signed blockchain transactions sending embedded processing instruction signals affecting the target address associated information content credential serves as a core system and method of the preferred embodiment.

For example, though not limited to, credentialed information validators may be programmed to interpret the presence of coin/token and/or the most recent transaction digitally signed with a specific reference data value associated key sent to a specified blockchain wallet container address as an "Active" or "Revoked" status state change event. On the carrier administration transaction, any combination of the amount of coin transferred and retained, the reference/meta data associated digital signature and/or the source and target wallet container address associated credentialed information (e.g. "Credentialed Information Status" address) may be interpreted as processing instruction logic to all distributed applications holding a copy of an instance of a blockchain client wallet container.

The use of natively secured transactions as signal carriers of information including processing instructions strengthens the administration of Credentialed Information without needing direct local access to a wallet container instance which may be distributed remotely. A credentialed information administrator may hold a copy of the Credentialed Portable Information Container wallet in escrow to support remote administrative control signaling without regard to distance or present connectivity of a remotely distributed Credentialed Information blockchain wallet. Credentialed Information administrative transactions may implement fee structures for executing administrative operations as the transaction may also transfer coin/token values. By definition of this preferred embodiment, the blockchain transactions between an authorized administrative wallet container account address and a target portable information container wallet account address associated with stored or referenced Credentialed Information content constitutes a state change or processing instruction signal.

Previous art purposely transmitted information as invalid data within the transaction amount field on Unspent Transaction Output (UTXO). Previous art using invalid transactions as information carriers was found to raise many issues especially in reference to the increased in-memory runtime processing burden impacting performance of the overall system. Conversely, the use of the subsequently introduced RETURN operator on provably unspendable (i.e. zero amount) blockchain transaction outputs exerted less impact than permanently invalid transactions. Yet in still, these unspendable transactions tend to bloat the blockchain with invalid output transactions in order to carry non-payment application specific data (e.g. 80 bytes on the Bitcoin core blockchain). Transmitting information using the RETURN Opcode with invalid output content may prove a viable compromise. Ideally, administrative and process instruction signaling information can be conveyed also on valid transaction output with spendable amounts.

The blockchain distributed ledger technology client wallet container serves as the host gateway container, cryptographic platform and communications utility for embedded or referenced credentialed information. The preferred embodiment uses baseline Bitcoin Core blockchain cryptographic and transaction ledger operations to administer immutable credentials for information issuer provenance and content integrity validation. The preferred embodiment protects information integrity from undetected modification which may lead to digital forgeries as found in media "deep fakes" or virus infected files and programs. The preferred embodiment protects information including but not limited to data of any format, encoding or domain. Information may also include programming interfaces, functions, routines or processing instructions invoked to retrieve and/or process associated credentialed information. Credentialed information includes, but is not limited to, structured digital records, unstructured text, binary, multi-media (audio/image/video) streams, files, events, logs, configuration, program modules, processing instructions, rules, micro-services, source code, compiled code, reference data, and metadata. The target operating set of the preferred embodiment encompasses the universe of all representations of digital information including the digital hash code signature of images of non-digital objects.

The preferred embodiment defines a system, method and protocol which leverages the transmission of administrative provenance and blockchain transactions which carry attestation hash codes and processing instructions. Utilizing and extending the normative blockchain client wallet container application programming interface (API), the preferred embodiment supports multiple communication and state synchronization patterns including hub and spoke multi-cast messaging, directed one-to-one messaging over encrypted channels and fan-in many-to-one style concentrators. An example of the preferred embodiment but not limited to such an implementation is the sending of a zero amount blockchain administrative provenance and attestation transaction with the output RETURN Opcode 80 byte text block populated with a hash code used to validate the integrity and fidelity of information content stored in association with the transaction target address. As with the blockchain wallet container identifying key (i.e. default first account address), each subsequent child account address created within a blockchain parent wallet container is the hash code output of its cryptographic key set. Each blockchain wallet container public key base generated address has a respective private key as part of the container-wallet's Public Key Infrastructure (PKI) implementation. The preferred embodiment leverages the blockchain wallet container as a portable cryptographic key vault, a credential administrator and portable information container storage facility.

Credentialed information may include, but is not limited to, general purpose or application specific domains of data, metadata, reference data and processing instructions. For example, but not limited to, the preferred embodiment may store to a target blockchain wallet container account address label a document, structured information set or a resolvable external reference to information content. The immutable information versioned in time and space is hashed with an algorithm (e.g. HMAC-SHA512) producing a resultant hash code which is then serialized into the blockchain provenance and attestation transaction output RETURN Opcode 80 byte payload. The blockchain provenance and attestation transaction is posted the blockchain distributed ledger using input transactions originating from the wallet container representing the information issuer or the information issuer's credential administrator.

The transaction target destination address is the aforementioned portable information container wallet account address where the information content is stored. In this scenario, the information issuer's attestation and integrity verification hash code is generally accessible to all participating blockchain instance nodes upon inspecting the provenance and attestation transaction output. Localized credential validation involves on demand rehashing the presented stored information content validating the real time output hash code to match the administrative transaction resident hash code thereby proving the content has not been altered since originally issued and stored. The preferred embodiment achieves validation without employing dependencies on central storage services, side chains nor a registry. Remote information content credential lifecycle administration functions are enabled by the preferred embodiment's transmission of contextual process instruction signal data embedded within blockchain transactions. Such contextual state may include, but is not limited to, "Credential Activation", "Credential Expiration", "Credential Revocation" and other relevantly applicable lifecycle status signals.

Information Content Access Control

Information Access Control applications may leverage the persisted administrative processing instruction signals to gate and grant access to the information content stored or externally referenced in the container wallet. In support of a time limited resource access control system, an implementation of the preferred embodiment may choose to issue tickets or licenses automating temporal expiry "time to live" ("TTL") credentialing. An implementation of the preferred embodiment creates a blockchain wallet container which serves as a TTL credential and leverages a baseline Bitcoin Core blockchain native capability of ("Time-lock") transaction release primitives as specified and implemented in BIP-65 and BIP-68 to automate the duration of time of network processing between a sequenced set of transactions. In this use case scenario, the preferred embodiment leverages sending sequenced administrative time-lock transactions with "Activated" and "Deactivated" event state embedded in the respective output RETURN Opcode. Extending the use case, usage metering can be implemented with the conditional sending of "deactivate" credential license transactions.

The preferred embodiment addresses deficits of previous art by combining the capabilities of core blockchain functionality from the transaction layer to the client container-wallet distributed application layer. The preferred embodiment employs, to civilization scale, a layer composed framework protocol. The preferred embodiment repeats a common, extensible and adjustable hybrid model where credentialed information or a reference thereof is persisted in blockchain client wallets with cryptographically integrated identity immutably stored on the blockchain. The preferred embodiment leverages the art of administrative provenance blockchain transactions to attest and secure credentialed information content stored natively within the blockchain client container-wallet or cross referenced to an external location. Administrative blockchain transactions can be postdated for future processing representing future state change operations using blockchain timelock/locktime (OpCode CLTV: CHECKLOCKTIMEVERIFY, BIP-68), sequencing and transaction lock/unlock script functionality (OpCode CSV: CHECKSEQUENCEVERIFY, BIP-112).

One example implementation, though not limited to, is the issuance of a resource access credential supporting policy enforcement, usage metering and payment collection. In the Access Control Authentication scenario, data and/or application programs/micro-services are accessed as resources only through an allocated blockchain wallet portable information container instance which serves as an access token or license generated by the resource administrator or possibly as a controlled copy of the blockchain wallet container holding information content or an external reference thereof. In either case, the preferred embodiment posts a standard administrative provenance and attestation transaction with a digital signature mapped to an "Activated" status or serialized meta data representing the Activated status embedded within the transaction.

A second pending "Timelock" delayed transaction is subsequently posted to the ledger having been digitally signed using the preferred embodiment applicable keys associated with the "Expired" status reference data value or serialized meta data representing the Expired status embedded within the transaction. In the preferred embodiment, the blockchain wallet container-based resource access ticket/token is now portable, edge verifiable, and implements an automated time to live ("TTL") signal ubiquitously available for inspection by the resource access gateway application as created using the preferred embodiment. Extending time to a credentialed resource access ticket can be easily achieved by the resource administrator container-wallet posting a transaction to the specific resource access ticket (e.g. Kerberos) container-wallet status account address with a digital signature mapped to an "Activated" status followed again by a timelock delayed "Expired" transaction. The preferred embodiment system and method signaling processing instructions may also add transaction value in the form of a coin or token as payment. The aforementioned is an example of a resource access solution using the preferred embodiment, but in no way is limited as the only design possible based upon the presented systems and methods of this invention.

Using the preferred embodiment of blockchain provenance and attestation credentialed information issuance for, as an example but not limited to, remote edge processing including validation, can be established for distributed application state change signaling and/or processing instruction syndication which triggers local edge execution. An authorized administrator may send a digitally signed transaction to a target account address as a processing instruction signal. The transaction digital signature creation and validation uses a client wallet account address public-private key pair associated with a reference datum code value resident as the credentialed information. As part of the preferred embodiment, the system and method of associating credentialed processing instructions in the form of data or program code to a digital signature key pair added one or more times to a blockchain transaction provides infinite extensibility.

In this example, as one of many possible, the reference data associated address keys may be in the same blockchain container-wallet as the transaction target address or in a separate container-wallet (i.e. library) referenced by a processing distributed application. The relationship between reference data values can also leverage the HD Key Generation method to establish correlated datum into a set as siblings of a common group or set derived sequentially from a parent HD key. Hence, the parent-child and derived sibling relationship of reference data values is established, administered and validated using hierarchical cryptographic keys. Each value is lifecycle managed as with any credentialed information allowing for revocation, deprecation and versioning. The added aspect of the preferred embodiment may seek to leverage the presence of a resident amount of coin/token in the credentialed resource access ticket container-wallet to signal additional directives to access control enforcement services.

This digital signature correlated processing instruction of a blockchain transaction embodiment method does not require a resident coin or token at the target address, though, does not preclude such an implementation based upon the requirements of the scenario. As an example, but not limited to, one or more transactions each with one or more digital signatures conveying context, state and/or processing instructions may also transfer an amount of coin/token sent as a form of payment and/or additional application logic signaling. Alternatively, the transactions may be essentially a fee only administrative transaction implemented by one means or another.

In the case that the Credential Information wallet holder misplaces the container-wallet or the container-wallet is compromised by malicious programs, this preferred embodiment leverages the blockchain client capability of multi-signature addresses (BIP-11 m of n) to allow a predetermined minimum number of digital signature specified parties to deactivate Credentialed Information associated with a wallet account address. For example, an authorized wallet holder may choose to restore the wallet from a backup or escrow service, then deactivate all copies of the Credential Information wallet simultaneously by transferring outbound the resident administrative coin/token without the aid of the issuer or their administrator.

In a related scenario, the credentialed information may be updated and hence versioned requiring the current version to be deprecated and reference the next version of the active credentialed information instance. Leveraging the preferred embodiment of this invention, for example but not limited to, an authorized party transfers the coin/token used for processing instruction of type ActiveStatus from the deprecated credentialed information address to the newly revised credentialed information address. The new address may or may not be resident within the same blockchain client container-wallet hosting the deprecated previous version of credentialed information content. If the new version of credentialed information content resides in a separate blockchain container-wallet, the preferred embodiment ideally utilizes a HD derived wallet to cryptographically create the blockchain query verifiable parent-child linked list relationship across versions of credentialed information content.

Further, as an example but not limited to, the ActiveStatus reference data is saved as credentialed information with the associated key used to digitally sign administrative transactions. Being one of the digital signatures applied to the provenance processing instruction transaction transferred to the new version of the credentialed information blockchain container-wallet account address, a validator program, micro-service or other application code may, in general, interpret the semantic intent by dereferencing the mapped reference data, business data or processing instruction based upon the digital signatures of the transactions. In essence, contextual information can be bound to blockchain transactions using container-wallet account address keys mapped to the stored context data to sign transactions.

BRIEF DESCRIPTION OF THE DIAGRAMS

Figures 0, 2:
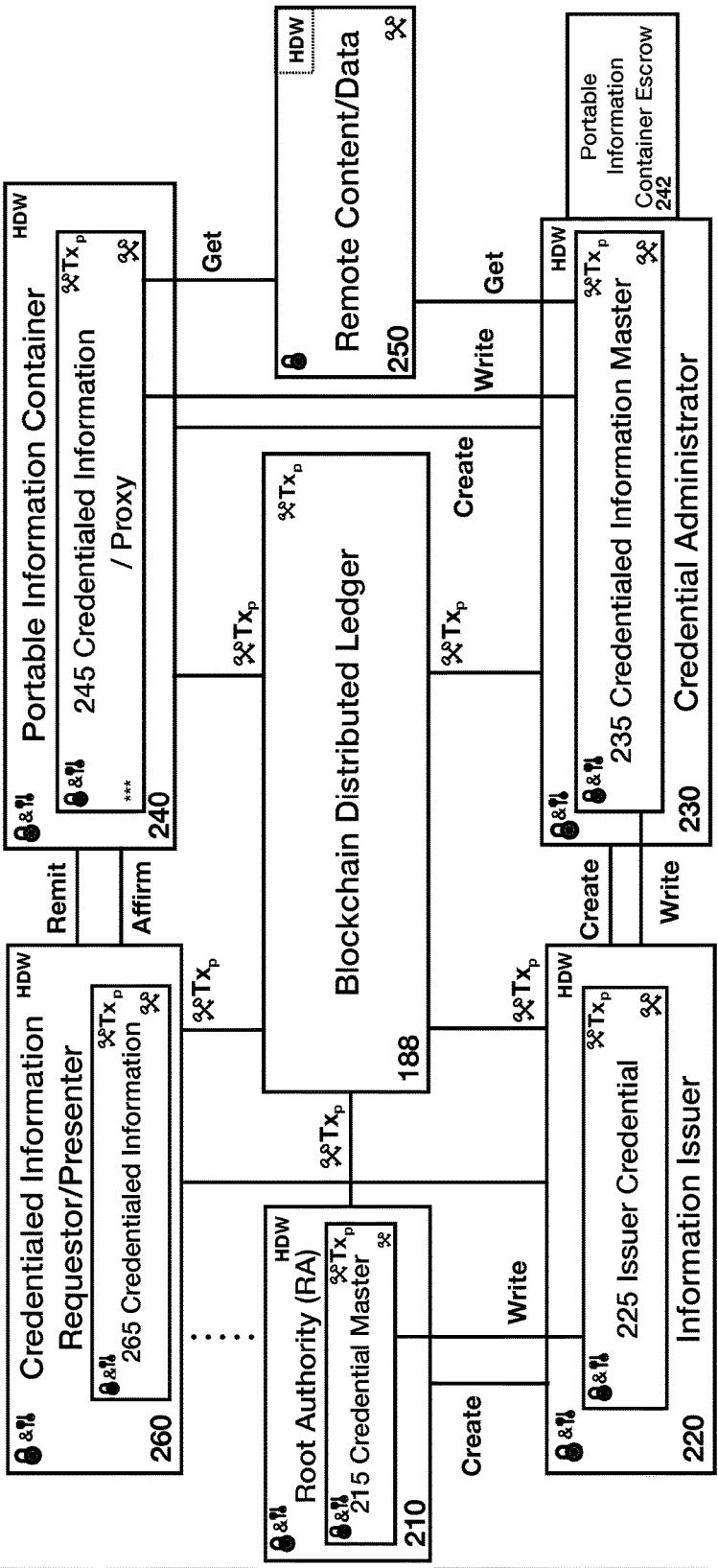
Figures 1, 2:
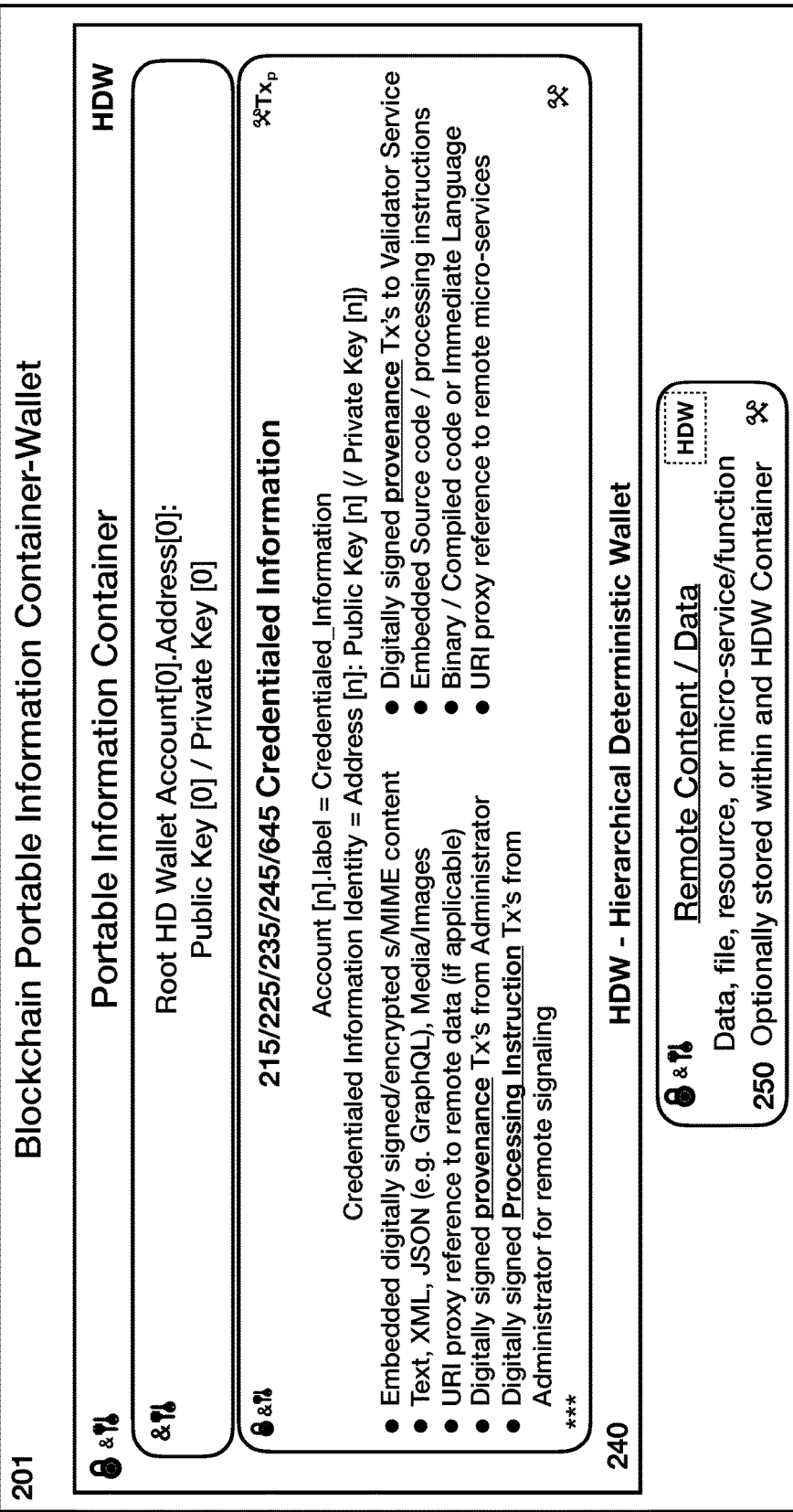
Figures 0, 3:
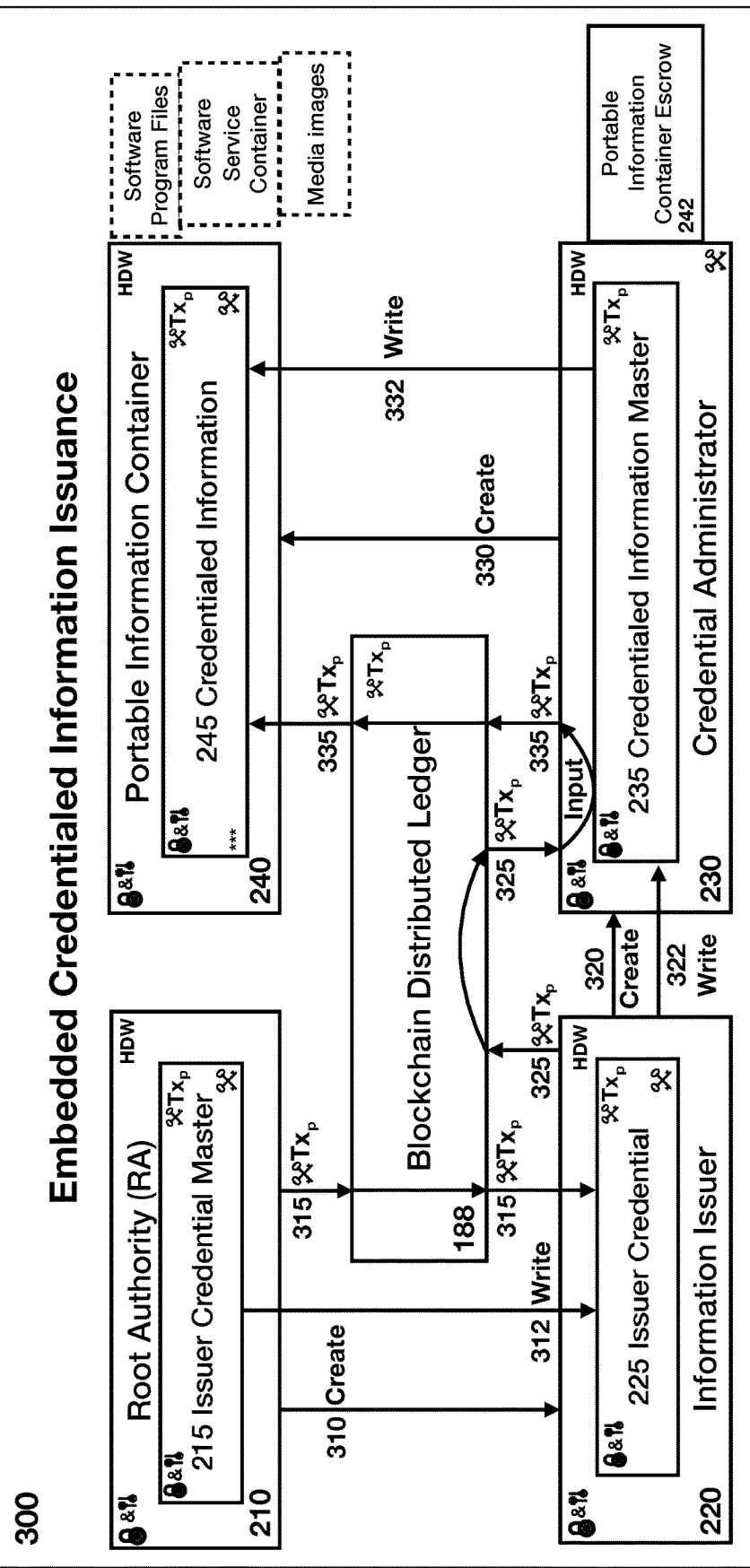
Figures 1, 3:
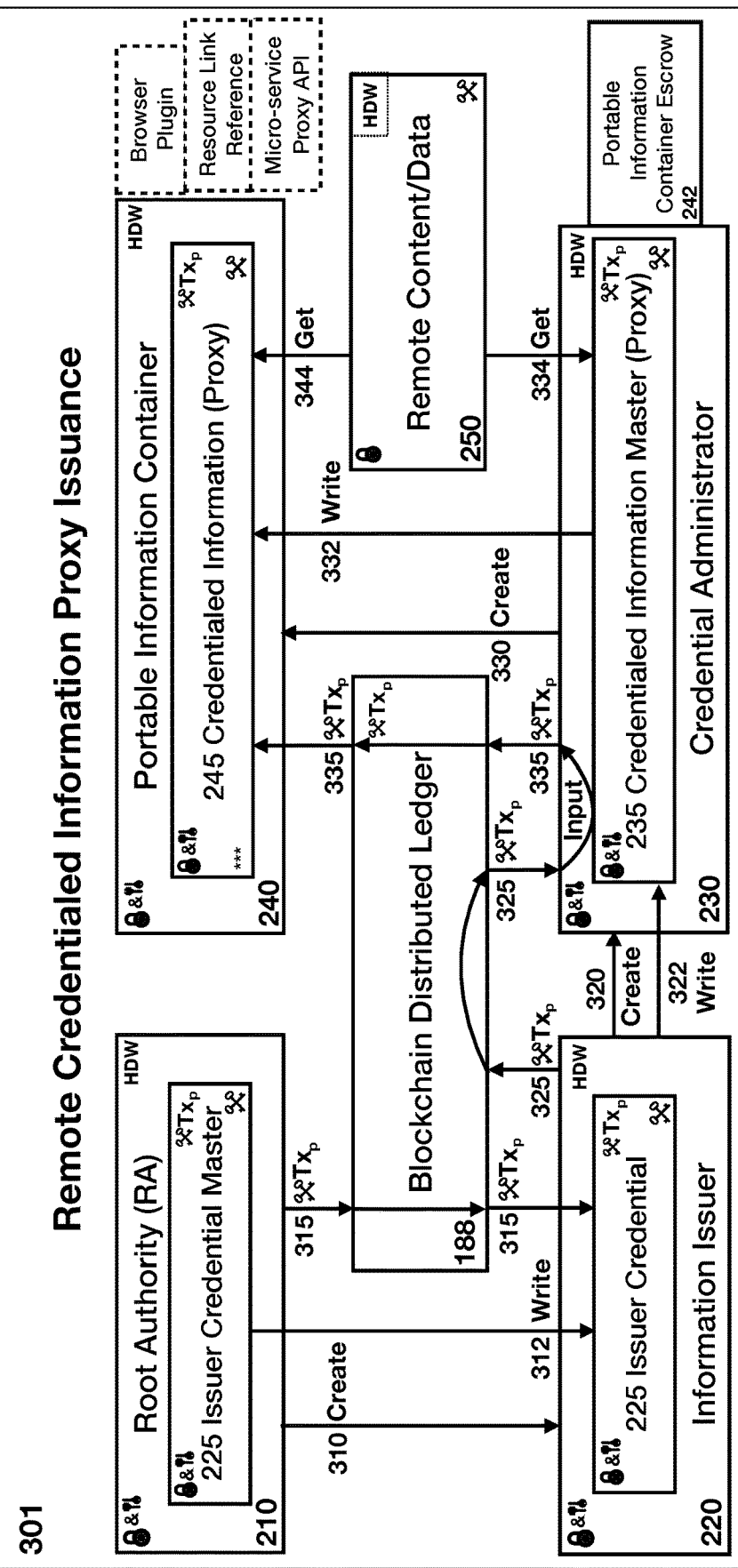
Figures 0, 4:
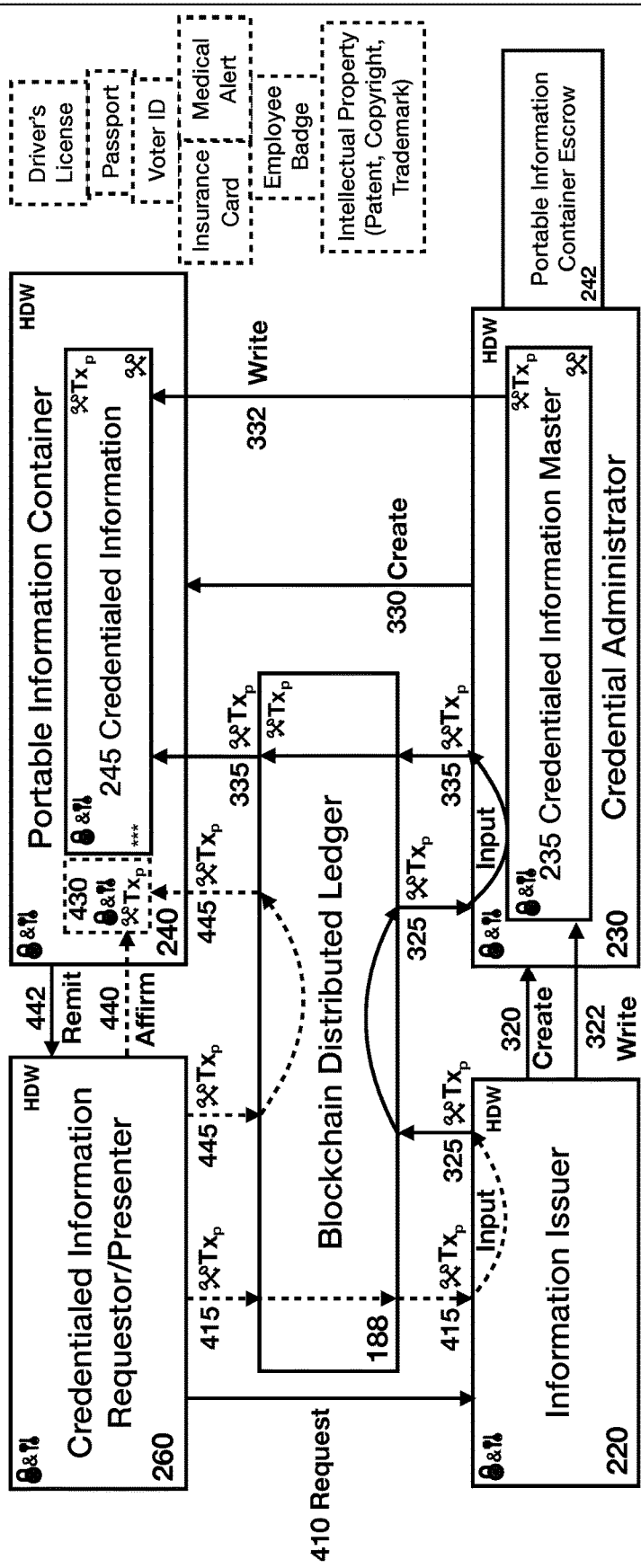
Figures 1, 4:
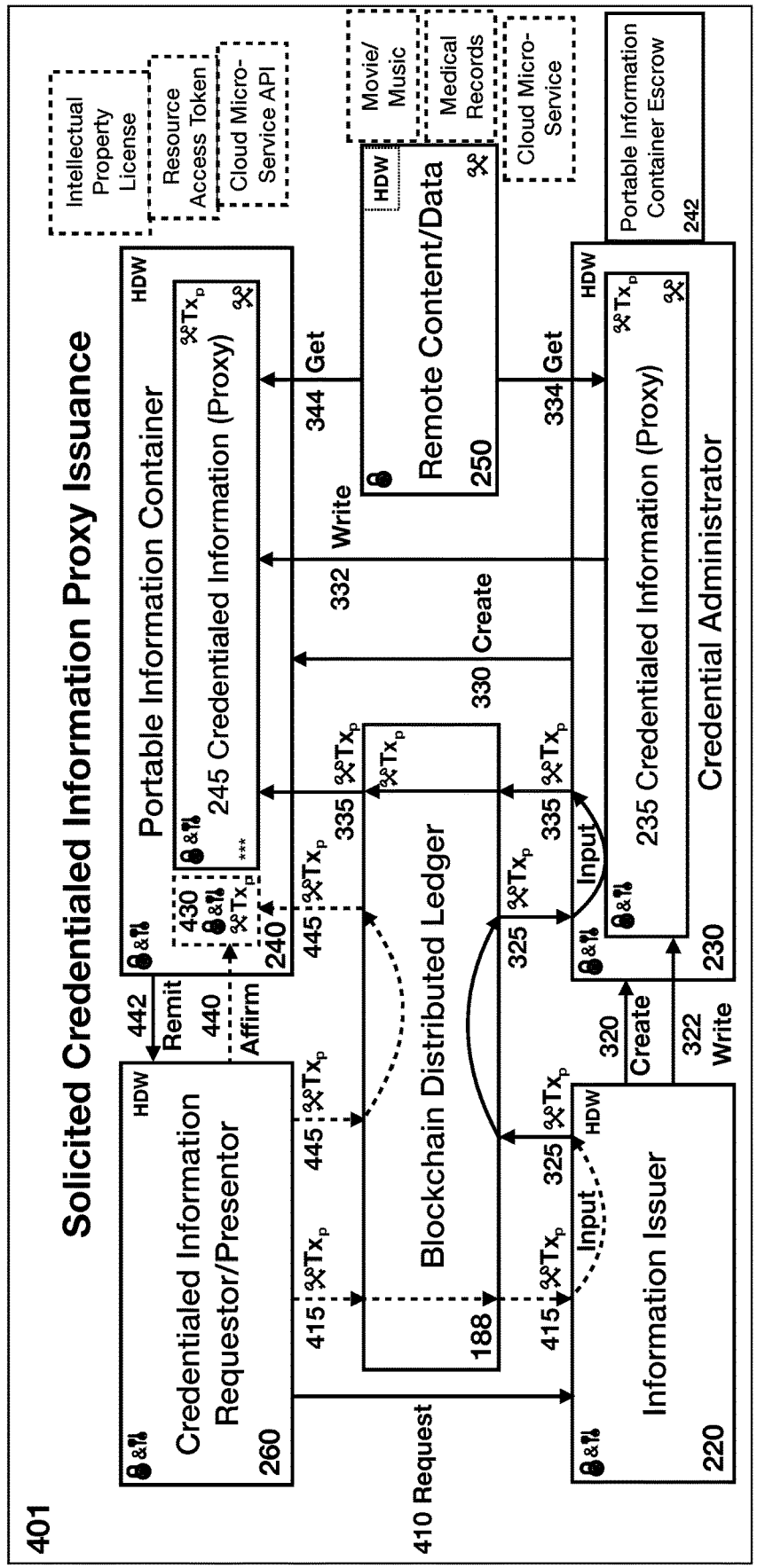
Figures 0, 6:
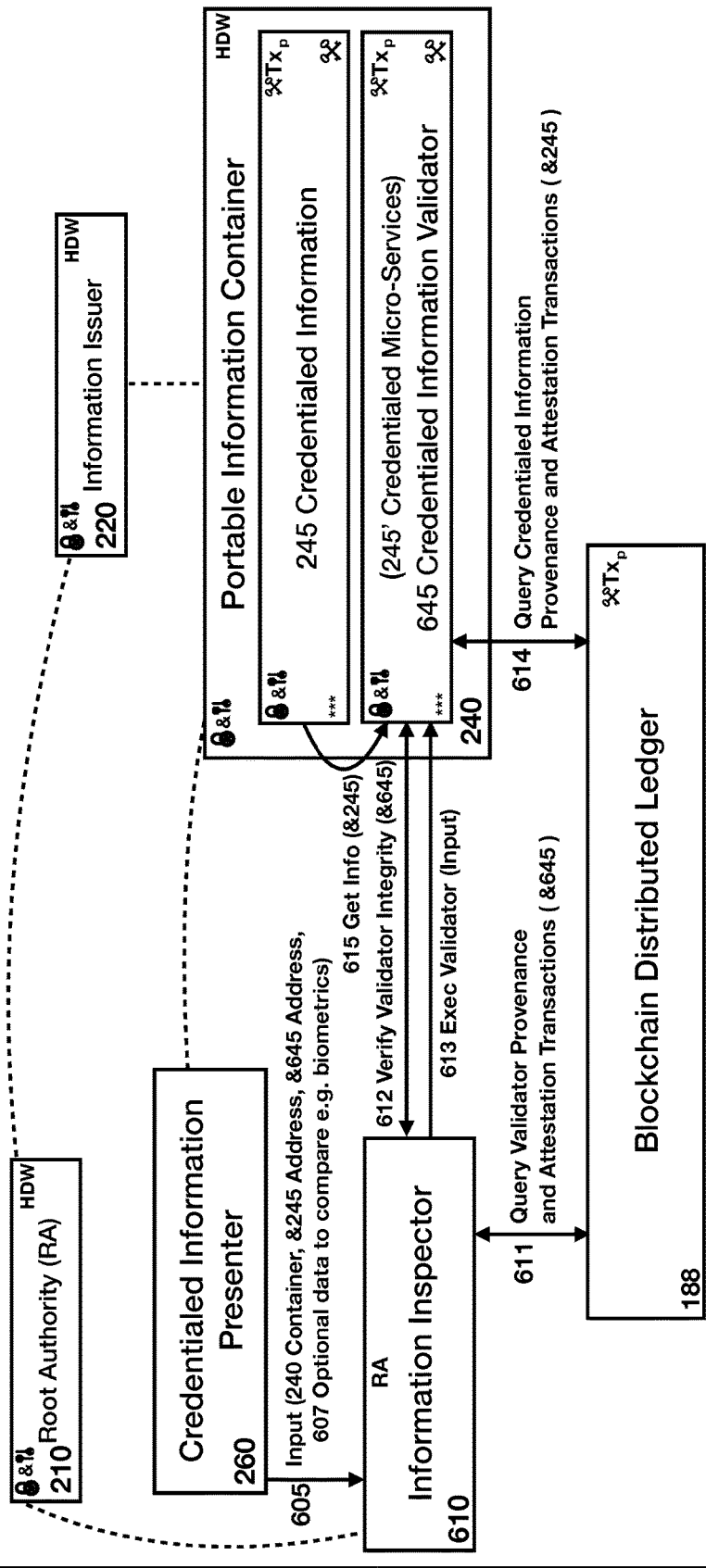
Figures 1, 6:
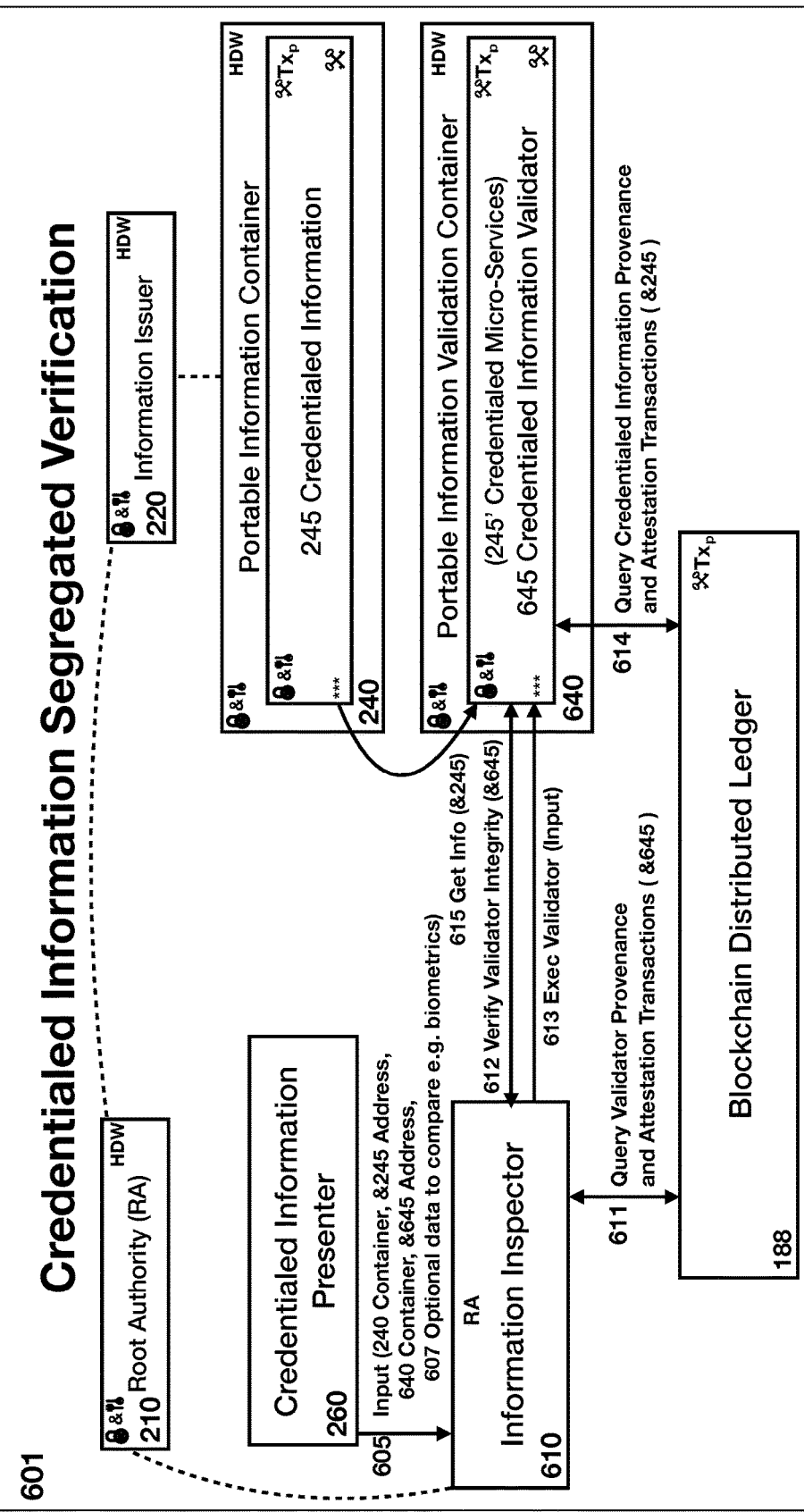

The foregoing summary, as well as the following detailed description of preferred embodiments, is best understood when read in conjunction with the appended drawings. In service of illustrating the invention, example constructions of the invention are depicted. The invention, however, is not limited to the specific methods and instrumentalities disclosed in the drawings. Drawing summaries include:

FIG. 1-0 is a block diagram of an example blockchain connected computing environment in which aspects of the invention may be implemented;

FIG. 2-0 is a block diagram of a system that employs a cryptographically secured blockchain container-wallet hosted credentialed information content issuance process whose correct operation depends upon immutable blockchain transaction distributed ledger established trust employing proof of information content issuance provenance chain originating with a trusted Root Authority (RA) to the authorized Information Issuer to the Credential Administrator producing the Portable Information Container hosting the Credentialed Information or Proxy reference thereto optionally remitted to a soliciting Credentialed Information Requestor/Presenter where the information content issuer credentialing includes provable attestation of the original state providing process instruction signaling facilities for lifecycle administration and communications;

FIG. 2-1 is a block diagram of a system that employs a cryptographically secured blockchain portable container-wallet to store credentialed information and/or proxy reference link to remote credentialed information in its native file format or optionally stored within a blockchain container-wallet;

FIG. 3-0 is a flow diagram of an example embedded credentialed information issuance process that cryptographically secures information content using blockchain container-wallet host which establishes trust through cryptographically verifiable information issuance provenance and blockchain distributed ledger transaction carried issuer attestation of information content fidelity and integrity in accordance with aspects of the invention;

FIG. 3-1 is a flow diagram of an example remote credentialed information proxy issuance process that cryptographically secures remote referenced access of information content using blockchain container-wallet host as proxy gateway which establishes trust through cryptographically verifiable information issuance provenance and blockchain distributed ledger transaction carried issuer attestation of information content fidelity and integrity in accordance with aspects of the invention;

FIG. 4-0 is a flow diagram of an example issuance process of embedded credentialed information remitted to a soliciting requestor for portability with issuer administered lifecycle status that cryptographically secures information content using a blockchain container-wallet host which establishes trust through cryptographically verifiable information issuance provenance and blockchain distributed ledger transaction carried issuer attestation of information content fidelity and integrity in accordance with aspects of the invention (e.g. Passport, driver's license, patent, copyright, trademark, purchase order, invoice, lien, warrant, court filing, certificate of birth/death, diploma, articles of incorporation, business license, etc.);

FIG. 4-1 is a flow diagram of an example issuance process of remote credentialed information proxy remitted to a soliciting requestor for portability with issuer administered lifecycle status that cryptographically secures information content using a blockchain container-wallet host which establishes trust through cryptographically verifiable information issuance provenance and blockchain distributed ledger transaction carried issuer attestation of information content fidelity and integrity in accordance with aspects of the invention (e.g. Portable resource access control ticket/token, intellectual property license, Kerberos, X.509 Certificate, OAuth Token, etc);

FIG. 5-0 is a flow diagram of an example multi-lateral credentialed information issuance process that facilitates two or more parties collaboratively constructing blockchain container-wallet hosted credentialed information for portability with issuer administered lifecycle status that cryptographically secures information content using a blockchain container-wallet host which establishes trust through cryptographically verifiable information issuance provenance and blockchain distributed ledger transaction carried issuer attestation of information content fidelity and integrity in accordance with aspects of the invention (e.g. Bi-lateral contracts, OTC Swaps, trades, loans, letter/line of credit, mortgages, marriage license, etc);

FIG. 6-0 is a flow diagram of an example Credentialed Information Integrated Validation process to verify provenance attestation binding to the Credentialed Information Issuer executing cryptographic operations and blockchain distributed ledger queries packaged and deployed for authorized reuse by an information issuer as part of a Credentialed Information Validator micro-service or programmatic function within the same Portable Information Container as the Credentialed Information in accordance with aspects of the invention;

FIG. 6-1 is a flow diagram of an example Credentialed Information Segregated Validation process to verify provenance attestation binding to the Credentialed Information Issuer executing cryptographic operations and blockchain distributed ledger queries packaged and deployed for authorized reuse by an information issuer as part of a Credentialed Information Validator micro-service or programmatic function in a separate Portable Information Container from that of the Credentialed Information as may be found in a competitive marketplace in accordance with aspects of the invention;

DETAILED DESCRIPTION OF ILLUSTRATIVE EMBODIMENTS

Overview

The following invention enables portable credentialed information with local edge validation operations at the point of information presentation without requiring dependency upon intermediary services in a potentially untrustworthy, disconnected or compromised state. The following invention leverages blockchain distributed ledger technology as foundational components and gateway container to safely store information and/or references to information which can be presented on demand and under the control of the presenter as delegated by an issuer. Digitally signed blockchain distributed ledger transactions are leveraged by this invention in a novel manner as a means to record and verify immutable provenance between information issuers and the information content stored and presented in portable Bitcoin Core compliant blockchain container-wallets at associated account addresses.

The preferred embodiment of this invention provides an immutable attestation record and verification as conveyed within administrative blockchain provenance transaction payloads. The preferred embodiment of the invention utilizes digitally signed blockchain distributed ledger transactions to signal administrative and/or processing instruction logic as a fundamental underlying protocol for distributed application development, deployment and administrative control. The preferred embodiment of this invention provides mechanisms to protect, convey with portability, lifecycle administer remotely and verify the fidelity and integrity of issued credentialed information.

This invention does not address the separate yet preferably addressed concerns of a foundational secure computing environment in which local cryptographic operations are executed free of malicious agents.

100 Exemplary Computing Environment Integrating Blockchain Distributed Ledger Technology (DLTech)

FIG. 1-0 shows an exemplary blockchain connected computing environment in which aspects of the invention may be implemented. The computing system environment 100 is only one possible example of a suitable computing environment which is not intended to infer any assumed limitation as to the scope of use or functionality of the invention. Neither shall the computing system environment 100 be perceived as having any dependency or requirement relating to any one or combination of components depicted in the exemplary computing system environment 100.

The invention maintains operational capabilities with numerous other general purpose or specialized for purpose computing system environments or configurations. Examples of well-known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, embedded systems, distributed computing environments that include any of the above systems or devices, and the like.

The invention may be described in the general context of a combination of computer readable information as data and computer-executable instructions, such as program modules, being executed by a computer. Generally, program modules include programs, routines, components, objects, data structures, micro-services, cloud services, infrastructure services, etc. performing specific tasks or implement particular data type abstractions. The invention is optimized to target distributed computing environments where tasks are performed by remote processing devices that are linked through a communications network or other data transmission medium but by no means is limited to such a computing topology. Distributed computing environments provide the option to locate executable program modules and other data locally and/or on remote computer storage media which includes memory storage devices.

The exemplary computing system environment referenced in FIG. 1-0 suited for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded, multi-core, multi-processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 including both volatile and nonvolatile media, as well as, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and accessible by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1-0 illustrates operating system 134, application programs (e.g. distributed ledger technology) 135, other programs/micro-services 136, and program data (e.g. blockchain transaction ledger) 137.

The computer 110 may also include other removable/non-removable, volatile/nonvolatile computer storage media. By way of example only, FIG. 1-0 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The magnetic, or solid state (SSD) hard disk drive 141 is typically connected to the system bus 121 through a non-removable memory interface such as interface 140, and magnetic, optical or solid state (SSD) disk drive 151 are typically connected to the system bus 121 by a removable memory interface, such as interface 150.

The drives and their associated computer storage media discussed above and illustrated in FIG. 1-0, provide storage of computer readable instructions, data structures, program modules and other data for the computer 110. In FIG. 1-0, for example, hard disk drive 141 is illustrated as storing operating system 144, application programs (e.g. distributed ledger technology) 145 such as blockchain client wallets, other programs/micro-services 146 such as blockchain cryptographic operations and peer to peer synchronizing whisper communications protocols, and program data (e.g. blockchain transaction ledger) 147. Note that these components can either be the same as or different from operating system 134, application programs 135, other programs/micro-services 136, and program data 137. Operating system 144, application programs 145, other programs/micro-services 146, and program data 147 are given different numbers to illustrate that, at a minimum, they are different copies.

A user may enter commands and information into the computer 110 through input devices such as a keyboard, cameras, microphones, touchscreen, writing and pointing devices 161. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A display device like a monitor 191 is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1-0. The logical connections depicted in FIG. 1-0 include a local area network (LAN) 171 and the internet/wide area network (WAN) 173, but may also include other networks. Such networking environments are commonplace in offices, homes, enterprise-wide computer networks, mobile networks, intranets and the Internet. As such, Blockchain Distributed Ledger Technology (DLTech) Compute Network 188 access is inherently available wherever internet connectivity is available.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem/router 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1-0 illustrates remote application programs 185 as residing on memory device 181. It will be appreciated that the network connections shown are exemplary and other means of establishing a communications link between the computers may be used.

Portable and Secure Information Content Issuance

The preferred embodiment enables a credentialed information content inspector to verify the fidelity and integrity of the data presented whether that inspector resides remotely on the edge of a network or within a centrally managed service. The information content inspector executes provably trusted validation services, which is also secured and issued as credentialed information content. The validation services of the preferred embodiment generically verifies information content credentials utilizing attestation mechanisms which cryptographically prove the information content originated with provenance from a trusted issuer in the presented immutable form unmodified since issuance.

200 Blockchain Container-Wallet Hosted Credentialed Information Issuance and Administration Bitcoin Core as the Normative Reference Baseline Blockchain Implementation The preferred embodiment provides for decentralized and autonomous credentialed information integrity validation by leveraging core blockchain distributed ledger technology 188 based secure transaction communications and cryptographic facilities. The preferred embodiment specifies a system and method of a model protocol establishing a remotely administered and digital ring-fenced container-wallet providing authorized access control and tamper detection of local edge available or remotely referenced information. In order to achieve the aforementioned capabilities, the invention relies entirely upon core functionality exposed by the blockchain transaction and cryptographic application program interface ("API"). Though many blockchain or distributed ledger facilities likewise support the requisite baseline functionality, the ("Bitcoin Core") API serves as an exemplar normative blockchain implementation and operating instance referenced by the preferred embodiment without exclusivity.

A blockchain connected computing environment may employ a keys upon which certain processes depend for their correct operation within the environment. As an example, the system key, or "SYSKEY" used by the MICROSOFT WINDOWS operating systems is one example of such a key, but is not a limiting example. In a preferred embodiment of this invention, the entropy key used to generate other keys adheres to the ratified and implemented BIP-32 and BIP-44 Bitcoin Improvement Proposal standards in generating a hardened Blockchain Distributed Ledger Technology Hierarchical Deterministic Wallet ("HD Wallet") Master Seed Key. The HD Wallet Master Seed Key upon which processes depend is a universally unique and cryptographically unpredictable key. The Blockchain Distributed Ledger Technology HD Wallet Master Seed Key generation facility is leveraged to create a hierarchical graph or tree of keys in a parent child relationship structure. The Blockchain HD Wallet Key Graph/Tree enables programs and applications depending only upon cryptographic operations to determine if a presented leaf HD Wallet Key is derived hierarchically from a trusted and known parent key in the HD Wallet Master Seed key graph/tree.

For example, but not limited to, the legacy model of certificate root authority can be decentralized allowing any entity to establish a root authority for their specific use case context. In turn, the embodied invention of blockchain container-wallet based cryptographic provenance and attestation provides a means by which HD Wallet Master Seed Keys can bridge across graph/tree hierarchies. Additionally, legacy certificate issuance can be integrated by treating the issued certificate as Credentialed Information content embedded in a blockchain container-wallet as per the preferred embodiment of the invention. Feasibly, legacy Root Certificate Authorities (CA) will distribute blockchain distributed ledger technology based certificates derived from blockchain HD Wallet Master Seed Keys as specified in BIP-32 and BIP-44. Additional integration between legacy certificate issuance and blockchain wallet key generation can occur when the keys generated by the blockchain wallet (with preference given to HD Wallet Keys) are used as legacy X.509 certificate hosted keys with certificate data hosted in the blockchain wallet with immutable transaction and signature based provenance employing hash based attestation of the credentialed information content. In this manner, the legacy systems requiring X.509 certificates can bridge and integrate with Blockchain container-wallet key based identity and authentication systems.

Core components in the FIG. 2-0 block diagram represents blockchain distributed ledger technology container-wallets with preference in the preferred embodiment given to BIP-32 compliant HD Wallets which support locally executed cryptographic derivation verification of generated keys. FIG. 2-0 shows an example system in which the Blockchain container-wallet hosted Credentialed Information issuance process operates with a core dependency on access to the blockchain distributed ledger technology 188 to execute cryptographic key operations. Such operations include, but are not limited to, key generation, digital signing of information, validation of digital signatures, sealing of information to dissuade tampering, hashing, encryption, and decryption. Additional facilities available are coin/token transfer transaction creation, peer to peer state synchronization eliminating any single point of failure, container-wallet account/address creation and securing transaction postings from a source container-wallet allowing only those authorized to execute a transfer. These fundamental services are building blocks leveraged by the embodied invention detailed here.

Each component and inherently dependent child processes depend upon their respective blockchain container-wallet cryptographic infrastructure services in order to operate correctly. The blockchain container-provides each component with direct access to an application program and a specifically selected blockchain network distributed ledger 188 of immutable transaction dissemination services. The preferred embodiment within does not make a distinction as to which blockchain is leveraged by any application program using the facilities embodied within this invention. The choice of existing blockchains or newly created blockchains, private or public, permission-ed or permission-less is an application program specific decision made orthogonal to the invention. This embodied invention intentionally operates on any standard blockchain implementation which adheres to the common core standards of the original bitcoin core blockchain.

Information Issuer 220 operates as a blockchain container-wallet linked through the embodied invention's blockchain transaction and HD Wallet generation based provenance enabling content attestation to one or more Issuer Root Authorities (RA) 210 which contains Credential Master 215 information (e.g. X.509 Certificate) as a form of as Credentialed Information. The Information Issuer 220 receives from the Root Authority (RA) 210 its Issuer Credential 225 also as Credentialed Information. The preferred embodiment of the system derives one or more Credential Administrators 230 from each Information Issuer 220. Using HD Key generation, each Credential Administrator 230 creates the target Portable Information Container 240 and writes/copies Credentialed Information Master 235 to the Credentialed Information 245 as originally provided by the Information Issuer 220. The Credential Administrator 230 also retains a copy of the Portable Information Container 240 in Escrow 242 to facilitate lifecycle administration operations.

In solicitation oriented scenarios 400 and 401, a Credentialed Information Requestor 260 requests of the Information Issuer 220 to create and remit a Portable Information Container 240 instance containing specific Credentialed Information 240 (e.g. Passport, Driver's License, Sovereign Identity, Health Insurance card, etc.). Initially, the Credentialed Information Requestor 260 may not have digital representation or identity to present the Information Issuer 220. As such, the Credentialed Information Requestor 260 may only provide what is available to them (e.g. biometric captured data) which can be used to as identifying data within Credentialed Information 245. The Credentialed Information Requestor 260 may contain identifying information which is validated and potentially propagated in the requested operation by the Information. Issuer 220. Likewise, the Credentialed Information Requestor 260 can verify the Information Issuer 220 is authorized by a trusted and known Issuer Root Authorities (RA) 210 (e.g. Government Agency, DMV, appropriate corporate entity, etc.) before presenting its information.

There are multiple Credential Administrator 230 topologies possible including, but not limited to, creating a single instance of a Credential Administrator 230 for each instance of Credentialed Information 245 containing Portable Information Container 240 which is created and distributed. Another topological system design possibly creates only a single instance of a Credential Administrator 230 for a set of Portable Information Container 240 instances. Such one to many relationships can mirror business or technical organizational structures or potentially reflect partitioning based upon other factors inherent in the specific implementation of information context and use case scenario. Implementations may choose a one to one or a one to many topology between the Information Issuer 220 to Credential Administrator 230 to Portable Information Container 240 instance. Ideally, though not required by this invention, the Blockchain HD Wallet/Key generation mechanism is leveraged along with the administrative digitally signed transaction provenance and digitally signed attestation chaining as embodied in this invention.

Portable Information Container 240 instances optionally receive an affirmation from the Credentialed Information Requestor 260 as additional Credentialed Information 240 written to a different address prior to escrow and remittance. At a later time, when engaging with a Credentialed Information Validator 640/645, the Credentialed Information Requestor 260 participates in the role of a Credentialed Information Presenter 260. The Credentialed Information Validator 640/645 queries the Blockchain Distributed Ledger 188 to validate the binding administrative transaction provenance and information content integrity attestation.

Portable Information Container 240 instances may serve as a proxy gateway to access external Remote Content/Data 250 which can be stored in native format or optionally also within a remote hosted (e.g. File share, cloud exposed micro-service) Portable Information Container 240 instance. The Portable Information Container 240 containing Credentialed Information Proxy reference links to the Remote Content/Data 250 may also take the form of resolvable and executable programmatic code or micro-service as easily as being a URL link to a file or HTTP rendered page.

The ideal embodiment of a secure and trusted computing environment provides for the safekeeping storage of each component with intrinsic cryptographic keys as well as the safe execution of cryptographic operations devoid of malicious programs attempting to capture secrets and compromise data or program integrity. Most importantly, the Credentialed Information Issuing Root Authority (RA) 210 must be protected from unauthorized access using native hardening and offline storage facilities as is best practice for blockchain container-wallet safekeeping. Additionally, leveraging a trusted compute platform where the HD Wallet Keys are stored on a TPM chip with cryptographic operations executed in curtained memory using hidden Central Processing Unit (CPU) 120 registers provides an ideally safe computing environment in which this invention embodiment operates.

It should be noted that process 200 is not limited to the traditional notion of a process—i.e., a unit of execution that can be managed by an operating system and assigned an address space. Expressly, process 200 refers more generally to any operation or series of operations that can be performed on a computer. It should be further noted that, while this example shows a process that is dependent on cryptographic key services, the term "process" as used herein is not limited to processes that perform cryptographic operations but in fact, builds upon said cryptographic services.

201 Blockchain Portable Information Container-Wallet

As part of the preferred embodiment, credentialed information content issuer provenance and attestation along with the requisite credential lifecycle administration is built upon the foundational application programming interface (API) of the normative Bitcoin Core blockchain network, distributed transaction ledger/database 188 and the portable information container-wallet 240 hosting resident credentialed information 245 content or a reference link thereto. The underlying blockchain foundation of the preferred embodiment requires the minimum capabilities as demonstrated by the original blockchain implementation of Bitcoin Core. The preferred embodiment may be described as a distributed digital information content issuance and administration system on distributed ledger blockchain technology.

In the preferred embodiment of this invention, the container-wallet is also an access gateway providing cryptographically anchored universally unique identity, security, information content privacy, and peer network communications implementing a shared state synchronization protocol. This decentralized portable credentialed information content container-wallet 240 is built upon a cryptographic key store and programmatic library of executable functions which generates public-private PKI cryptographic key pairs. These client container-wallet key pairs are inputs into a hashing function to generate blockchain container-wallet addresses. Hence container-wallet keys and addresses are correlated with cryptographic provability. The preferred embodiment strongly encourages leveraging the Hierarchical Deterministic Key ("HDKey") generation technology defined by the Bitcoin Improvement Proposal 32 ("BIP-32") as implemented by Bitcoin Core for deriving parent-child cryptographically correlated container-wallets. The relationship between Hierarchical Deterministic ("HD") derived container-wallet keys are cryptographically verifiable locally on the network edge requiring only the common blockchain core library of key hashing functions along with blockchain transaction ledger 188 access. Child Key Derivation ("CKD") leverages the Hash-based Message Authentication Code ("HMAC")-SHA512 algorithm to generate parent-child key trees and chains. When utilizing derived HD container-wallet and key generation technology, provenance verification that portable information container-wallet was derived from a parent or master container-wallet like that of an Credential Administrator 230 becomes a trivial function invocation.

FIG. 2-1 provides a diagram 201 of the general Portable Information Container 240 implementation of a normative Bitcoin Core blockchain container-wallet representing all other components likewise derived accordingly (e.g. Root Authority (RA) 210, Information Issuer 220, Credential Administrator 230, Credentialed Information Requestor 260). A documented in the Bitcoin Core implementation, a blockchain wallet is identified by its base Account[0] address[0]. Each account supplies a label field allowing for the persistence of serialized information. An account may have 1 or more addresses sharing their common account label. As such, it is possible for an application to leverage this construct to assign multiple addresses to the Credentialed Information 245 resident at the account level whereby each address serves a segmented purpose. Each address is derived from a internally persisted PKI public key and passcode sealed encrypted private key. Resident Credentialed Information 245 may be individually signed and encrypted using the associate keys. Given the list of addresses within a blockchain container-wallet, all transactions to or from the container-wallet can be retrieved from the blockchain ledger of transactions. Transactions can be digitally signed and verified using these PKI keys as well.

300 Embedded Credentialed Information Issuance

Credentialed Information Content Issuer Chain Relationship Binding

The credentialing of information locally persisted within blockchain container-wallet or remotely referenced (e.g. URI/URL links stored within the container-wallet) depends upon content hash code metadata embedded within digitally signed administrative blockchain provenance transaction output sent from a credentialed information issuer's container to the associated address of the target portable information container. The use of administrative "Data Carrier" blockchain transactions serves as a core construct of the preferred embodiment's credentialed information provenance and attestation protocol. The credentialed information provenance and attestation protocol is a scalable and repeatable decentralized model used to establish, record and discover the immutable relationships between acting role-based entities manifest as container-wallets with key identifier addresses of the disseminating information content.

As an example of the preferred embodiment, but not limited to a particular implementation, blockchain transactions are transmitted between the blockchain client container-wallet(s) of the credentialed information issuer 220, the issuer's credential administrator 230 and, if applicable, that of the credentialed information requestor 260 to the blockchain address within the client portable information container-wallet 240 hosting the associated credentialed information 245 and/or the reference to remotely content/data 250. The preferred embodiment defines an information content credentialing process and protocol which immutably correlates cryptographic attestation of the information issuer as administrative blockchain provenance transactions binding the participating entities to the target credentialed information content 245.

Administrative Blockchain Provenance Transactions

The preferred embodiment leverages administrative blockchain transaction outputs which contain a repeatable hash-based authentication code unique to the credentialed information content as persisted in the container-wallet or externally referenced by a proxy link located at the administrative provenance transaction target blockchain address. To further strengthen issuer provenance, the administrative provenance transactions may be digitally signed by the issuer(s) and/or their administrator(s). The administrative provenance transaction establishes the authoritative attestation information content hash code on the blockchain to verify that the issuer persisted credentialed information to a blockchain container-wallet at the transaction target address has not been modified. The information issuer embeds an implementation defined data structure of fields in the blockchain provenance transaction output RETURN Opcode payload which includes at a minimum the hashing algorithm output value for the given target information content. The preferred embodiment provides in the aforementioned an exemplar implementation of the chain of credentialed information issuance container entities but is not limited to such an implementation.

For example, another implementation of the preferred embodiment may collapse the RA 210, information issuer 220 and credential administrator 230 roles into a single container role implementation. The preferred embodiment provides for extensible RETURN Opcode payload content of the administrative transaction output to support application specific signals and state changes as required in the lifecycle administration of the credentialed information 245 within the distributed portable information container-wallets 240. These administrative transactions may also be digitally signed by the sending issuer as a means to strengthen the provenance. Metadata and reference data used for lifecycle administration may appear in the output transaction as clear text, encoded application specific code values, or possibly as digital signatures whereby the sender's PKI keys used in signing a transaction are correlated to an application specific blockchain container-wallet address where individual reference data values are persisted per address/key pair (e.g. lifecycle state values of CredentialActivated, Credential Revoked, CredentialSuspended, etc.). Hence, the digital signature of the administrative transaction is mappable to a reference data value.

In FIG. 3-0, the flow diagram 300 depicts the unsolicited blockchain credentialed information issuance process 300 where credentialed information is issued without an explicit Credentialed Information Requestor 260 solicitation. One example of this process may be, but is not limited to, an Internet of Things (IoT) camera or recording device acting as an Information Issuer 220 produces media images in files as unsolicited Credentialed Information 245 with the aid of a Credential Administrator 230 as a matter of standard operations. Another example may be automated credentialing of all saved information in a general-purpose data store. In such a scenario, the information source may, as an implementation detail, be designated the Information Issuer 220. The Credentialed Information 245 may contain the data or a link to the data as a file, a query or a function call to a system interface passing the specific input parameter values required to consistently return a specific data set versioned in time and space. In the preferred embodiment, the data brokering service uses the Credentialed Information 245 address or PKI key as the gating identifier for the data.

The Information Issuer 220 operates as a blockchain container-wallet linked through the embodied invention's administrative blockchain provenance transactions 315 and HD Wallet derivation 310 from one or more Issuer Root Authorities (RA) 210 each containing Credential Master 215 information (e.g. X.509 Certificate) as a form of Credentialed Information. The Root Authority (RA) 210 writes 312 the Issuer Credential 225 to the Information Issuer 220. The Root Authorities (RA) 210 establishes transaction based provenance by posting a digitally signed blockchain administrative provenance transaction 315, not requiring any actual coin or token amount, to the address in the Information Issuer 220 where the Issuer Credential 225 was written 312. To achieve attestation that ensures any modification made to the Issuer Credential 225 will be discovered by an inspector or validator, the Issuer Root Authorities (RA) 210 hashes the Issuer Credential content 225 persisting the value in the transaction output 315.

One mechanism, but not limited as such, is to store the hash code authentication value in the output transaction 315 RETURN Opcode. This repeatable method applies across all bindings between facilitating objects that utilize the blockchain container-wallet as a store of credentialed information generically. Any validation service or program can rehash the credentialed information, in this case Issuer Credential 225, and compare the output value to that stored in the transaction at that address. If the values match, the content has not been altered since its original persistence. This provenance and attestation mechanism using optional zero value administrative blockchain provenance transactions which carry in their transaction output RETURN Opcode the information content hash code value for information content integrity and fidelity verification is applicable to such information content issuance operations as a repeatable pattern throughout the preferred embodiment.

The preferred embodiment of the system creates or binds 320 to one or more Credential Administrators 230 from each Information Issuer 220. The information Issuer writes 322 the Credentialed Information Master 235 in the Credential Administrator 230. The Information Issuer 220 posts a digitally signed blockchain administrative provenance transaction 325, not requiring any actual coin or token amount, to the address of the Credentialed Information Master 235 in the Credential Administrator 230 where the Credential Master 215 information was written 322. To bind the provenance across the chain of participating roles from the Information Issuer 220 to the Credential Administrator 230 to the target Portable Information Container 240, the Credential Administrator 230 or any other intermediary participant service selects the administrative provenance transaction 325 posted by the Information Issuer 220 as transaction input when posting the outbound administrative provenance transaction out 335 to the address of the Credentialed Information 245 within the Portable Information Container 240. Essentially, the linked list of transaction input and transaction output records in detail every point or link in the provenance transaction chain.

Using HD Key generation, the Credential Administrator 230 creates 330 the target Portable Information Container 240 and writes/copies 332 the Credentialed Information Master 235 to the Portable Information Container's 240 Credentialed Information 245 address as originally provided by the Information Issuer 220. The Credential Administrator 230 establishes transaction based provenance by posting a digitally signed blockchain administrative provenance transaction 335 to the Portable Information Container's 240 Credentialed Information 245 address as written 312. To achieve attestation that ensures any modification made to the Credentialed Information 245 will be discovered by an inspector or validator, the Credential Administrator 230 hashes the Credentialed Information 245 persisting the output value in the administrative provenance transaction output 335.

The Credential Administrator 230 also retains a copy of the Portable Information Container 240 in the Portable Information Container Escrow 242 to facilitate lifecycle administration operations like adding new addresses with associated Credentialed Information 245 content to version the information content. Maintaining the escrow also allows the Credential Administrator 230 to simply distribute copies on demand from escrow as needed without repeating any of the required operations. Any lifecycle signals posted via administrative transactions to the address of the Credentialed Information 245 applies to all copies distributed in a multi-cast manner. This principle feature of the preferred embodiment of this invention enables many application scenarios requiring resilient remote administrative and application signaling communications functionality.

Typical use case scenarios covered by this topology are, but not limited to, software program files and libraries, software service container with embedded component manifest packaging, and media image/recording files.

Credentialed Identity Micro-Services

A digital identity wallet container with embedded demographic and biometric credentialed information accompanied by local data access functions answering contextual questions serves as a prime example of a credentialed micro-service implementation leveraging the preferred embodiment. In such a scenario, "date of birth" data privacy may be obfuscated and protected by making available in the same container a public "Age Verification" micro-service function "verifyAge" with inputs of "minimum age", "maximum age" and true or false value output of "input verified". Allowing for a 0 minimum age and NULL maximum age supports "older than", younger than" and age range band queries.

exec InformationContainer.verifyAge ([in] integer minimumAge, [in] integer maximumAge, [out] boolean inputVerified)

In a similar fashion as with the age verifier credentialed micro-service, biometric data hash privacy (e.g. photo, fingerprints, DNA, voiceprint) can be protected in the preferred embodiment by means of content encryption with publicly accessible micro-services to compare real-time biometric data as input with that which is resident as credentialed information within or referenced from within the container. Expanding upon the above age verification example, the inspector will undoubtably also need to verify both the credentialed demographic information and biometrics of the presenter. The inspector can real-time capture the picture or fingerprint of the presenter, execute the required hashing algorithm passing the resultant hash as input into the local biometric validation micro-service which simply compares the input hash to the resident and verified as unaltered since issuance (see previously detailed HMAC content validation) credentialed biometric information (e.g. verifyFingerPrintHash([in] char*fingerPrintHash, [out] boolean inputVerified)

Distributing Programmatic Processing Instruction Code for Edge Localized Execution The blockchain HD key generation, and contextual digitally signed blockchain provenance transactions serve as the preferred embodiment attested proof of provenance. HD container-wallet/key generation and administrative provenance transactions are leveraged to pair bond multiple credentialed information sets including, but not limited to, a data set with programmatic data accessor functions and validation functions agnostic to programming language, syntax, format or execution runtime choices. In such fashion, libraries of code, script, configuration, application logic, processing instructions, rules, reference data, metadata, etc are a sub classification of credentialed information with applicable attestation provenance binding and lifecycle administration facilities as specified by this preferred embodiment.

In one example implementation of the preferred embodiment, but not limited to, processing instructions of an implementation defined classification "micro-service" may be distributed as embedded code or an external reference therein (e.g. cloud services) within a blockchain client "wallet" container extended for use as a "credentialed hierarchical information container". Therefore, as with any credentialed information, defined processing instructions, of a particular version, receive idem potent identity as a public-private key pair for any chosen organizing granularity (e.g. function, library, package, application, process, etc.) which are likewise used for cryptographic operations including secured client access control, encrypted channel communications and content encryption.

The loading and executing of processing instructions, as with any credentialed information, must comply with the security constraints as enforced by blockchain core client access control facilities. Leveraging available native capabilities of the baseline blockchain core client container-wallet, all embedded credentialed information can be encrypted to prevent unauthorized access to the data. In essence, the portable information container-wallet operates as an opaque decode device holding mapped processing signal code and reference data values only known to authorized holders.

In the preferred embodiment, relationships between interdependent instances of credentialed information content at an associated public-private key based account address within one or more host containers may be immutably recorded and discovered by means of digitally signed administrative blockchain transactions. Additionally, creating cryptographically verifiable hierarchical deterministic "wallet" container instances and child account addresses as credentialed information identifiers provide additional provenance and attestation of associated information relationships. As part of the preferred embodiment, the relationship between a root authority, information issuer organization units, administrative applications and credentialed information instances are immutably established with no dependency on a central registry besides the ubiquitously available blockchain transaction ledger itself and blockchain core cryptographic key relationship verification functions. This very same model is used to record the relationships between temporal versions of information by establishing a linked list from the previous to then next version. The next version identifier may be created as a child container-wallet of the parent previous version container-wallet or a child address in a series within the same container.

Information content manifest in many forms including but not limited to representations of data, process state and/or programmatic instructions in the form of program code and/or configuration versioned in time and space. A great many interactions between people, organizations and things involve the transfer of information whereby the validity of the information issuer and content fidelity serve as a gating factor for acceptance, loading, ingestion and processing by the receiver. Cryptographic operations provide functional capabilities to support sealing, digitally signing, validating and encrypting information. A great challenge ensues in the safekeeping management of cryptographic keys, and the associated data upon which they operate.

301 Remote Credentialed Information Proxy Issuance

FIG. 3-1 is a flow diagram nearly identical to that of FIG. 3-0 except that the Credentialed Information (Proxy) 245 written/copied 332 by the Credential Administrator 230 to the Portable Information Container 240 contains a reference link to external Remote Content/Data 250. The external reference link can take any resolvable form such as HTTP URL's, URI's, File location path, programmatic remote procedure call (RPC) or possibly a cloud micro-service interface. The blockchain administrative provenance transaction 335 includes the attestation hash base authentication code of the reference link to external Remote Content/Data 250. If the retrieved Remote Content/Data 250 returned from the Get operation 334/344 is immutable and unchanging, the Credential Administrator may also choose to Get 334 the external Remote Content/Data 250 and generate a hash based authentication code and add it to the attestation value set within the administrative provenance transaction output RETURN Opcode structure 335. Hence, providing validators with hash code values for both the Credentialed Information (Proxy) 245 and that of the Remote Content/Data 250.

The information content associated container-wallet address, the container-wallet address associated PKI public-private keys and/or the information content hash based key serves as an idem potent universally unique identity of the information content which may be used for retrieval from the remote source. The remote information content source may serve as, but is not limited to, simple object storage, content brokering cloud micro-service, an application programming interface (API), executable function or a decentralized edge storage container. The remote information content store, server and/or broker may in its implementation, but not limited as such, retain a copy of the container-wallet which was distributed to accessing remote clients as a means of verifying requestor validity and establishing secure communications channel using the PKI key pair associated with the client gateway service blockchain address within the container-wallet. The client gateway container-wallet may be created and issued as an HD Wallet child of a parent container-wallet which retains the stored information content. The link reference between the client gateway container-wallet API address and the information content is ideally maintained on the blockchain as an administrative transaction.

The information content address associate PKI key pair and hash key code can be leveraged in the preferred embodiment to establish a client allocated and content specific secure network communications connection. Though not limited to a specific implementation, the preferred embodiment may choose to execute the open standard Transport Layer Security (TLS) to establish a secure TCP/IP connection and data interchange tunnel between two endpoints utilizing the information content HMAC (Hash based Message Authentication Code) and blockchain container-wallet address associated key pairs. An administrator 230 or remote service storing information content 250 may send a "Phone Home" signal to retrieve updated information content versions via the preferred embodiment's administrative transaction signaling mechanism.

Typical use case scenarios covered by this topology are, but not limited to, internet browser plugin, resource link reference and micro-service API's.

Credentialed Micro-Services

The preferred embodiment provides defines, but is not limited to, a process and protocol for credentialed information issuance, party binding, immutable provenance, containment, distributed administration, security, and privacy. As an extension of the aforementioned capabilities, the preferred embodiment also defines a service framework, referred to as Credentialed Micro-Services ("CMS"). For example, a credentialed micro-service may implement, but is not limited to, local credential validation and data access functions. As a subset of credentialed information, micro-services may include, but are not limited to, functions, programs, interactive applications, processing instructions, rules, constraints, utility code and analytics. As with credentialed information in the form of data, invocable credentialed micro-services resides also within a blockchain wallet container at a discrete address as completely self-contained code (e.g. Lambda runtime and function), as an embedded linked reference to an external service (e.g. web based cloud micro-service) or a combination thereof.

Pair Bonded Credentialed Information and Micro-Services

Credentialed micro-services may reside collocated with associated credentialed information upon which it may operate within the same container. Alternatively, credentialed micro-services may reside in a separate container from that of the embedded or referenced credentialed information. In all permutations of pair bonded embedded and/or externally referenced credentialed information and associated micro-services, the same administrative provenance transaction process and protocol of the preferred embodiment are leveraged to immutably establish and administer the relationships. In the simplest of all scenarios as is often found in many cloud based services, credentialed micro-services may stand alone without associated immutably identified credentialed information. The data as input or output may not be credentialed but instead is passed by value as part of the micro-service implementation (e.g. given a query return rows from a database). When there exists a pair bonded relationship between credentialed information and associated credentialed micro-services, information privacy can be achieved by encrypting at the content level while exposing container resident micro-services. The credentialed micro-service with runtime verification of issuer provenance and content integrity may leverage access to the container key pairs to decrypt the credentialed information as needed to operate upon the data when invoked.

Synchronous and Asynchronous Credentialed Micro-Service Execution Patterns

As part of the preferred embodiment, credentialed micro-services can be implemented as a local client-directed blocking synchronous procedure call where the micro-service executes in the process space of the invoking client. Alternatively, as part of the preferred embodiment, a client application may choose to invoke a credentialed micro-service using a non-blocking asynchronous model where an execution directive is sent as an administrative "Process Signal Transaction" ("PSTx") to the blockchain address of the micro-service. Any required input parameters are included in the transaction output data structure. The micro-service container implements a Process Signal Broker ("PSB") which listens for transactions sent to a micro-service address for invocation upon receiving a valid process signal from a provenance verified credentialed information portable container-wallet (e.g. service access control license container). The process signal broker passes input parameters into the micro-service upon execution. If a reply with process execution return output data is required and directed (e.g. input params may be used to define expected return/output behavior), the process signal broker constructs a "Process Return Transaction" ("PRTx") as a reply to the source address unless otherwise directed by input reply-to conveyed semantics. The process signal broker can embed any required output data structure and values in the process return transaction output which may be hashed to comply with space limitations and privacy concerns.

Multi-Cast Processing Instruction Distribution

The asynchronous micro-service invocation model of the preferred embodiment enables the capability of massively distributed, and virally scalable operations at the edge. Each instance (copy) of a micro-service template executes from a single processing instruction signal transaction but in the context of the discreet credentialed information. Each micro-service template instance copy has blockchain recorded provenance transaction pair binding. In effect, a single multi-cast process signal transaction sent to the single micro-service template address will invoke operations that act upon localized credentialed information.

"Mass credential revocation", "connect and retrieve versioned upgrades over address specific private channels" or simply "report status" directives can be multi-cast to defined and controlled edge endpoints each with a copy of the same portable information container-wallet. Effectively allowing each edge node to listen on a common channel by monitoring provenance verified administrative transactions posted to a shared address acting as a multi-cast channel. The preferred embodiment employs a common model and protocol to scale down administer single nodes or scale up virally administer a targeted yet unlimited number of nodes without introducing a single point of failure. This scalable administrative capability provides a secure infrastructure and communications substrate to support a multitude of Internet of Things ("IoT") device feedback and control scenarios. Using the aforementioned model of the preferred embodiment, each device may retain a resident unique and device specific credentialed information container-wallet along with a shared credentialed micro-service container instance (copy) facilitating scalable multi-cast administration.

400 Solicited Embedded Credentialed Information Issuance

The flow diagram 400 of FIG. 4-0 detailing the Solicited Embedded Credentialed Information Issuance process depicts a process whereby a Credentialed Information Requestor 260 solicits/requests 410 the issuance of Credentialed Information 245 within a Portable Information Container 240 from an authorized Information Issuer 220. One example of this process may be, but is not limited to, a human requesting legal entity identity like that of a government issued driver's license, business license, passport, social security card, employer or insurer issued company badge or healthcare card. Credentialed Information Requestors 260 solicit/request Information Issuers 220 to create and deliver to them a portable 240 Credentialed Information 245 with the aid of a Credential Administrator 230.

In such a solicitation initiated scenario, the delivered credentialed information 245 may include information 410 provided by the Credentialed Information Requestor 260 combined with Information Issuer 220 supplied information 322. As an example, but not limited to, Credentialed Information 245 may contain digitized biometric data like facial, fingerprint, retinal and/or voice recognition data captured as part of the solicited request 410 by the Credentialed Information Requestor's 260 in-person on-boarding process 410. Such biometric information once sealed in the Credentialed Information 245 can be readily used by a Credentialed Information Validator 645 to validate the identity of the Credentialed Information Requestor/Presenter 260 comparing biometric data collected at the time of validation to that of the recorded biometric Credentialed Information embedded within the Portable Information Container wallet 240.

The ideal embodiment of the invention for this scenario begins with a Credentialed Information Requestor 260 soliciting an Information Issuer 220 to create and deliver to them a portable information container 240 with embedded Credentialed Information 245. As is common in many similar scenarios, the Credentialed Information Requestor 260 may be required to physically present corroborating evidence of their identity to an authorized Information Issuer 220 at which point additional biometric and personal information is captured like a digital facial photograph, fingerprints, retinal scan, voice or possibly a DNA sample 410. Optionally, the Credentialed Information Requestor 260 may provide a digital payment 415 which may also be used as part of the initiating administrative provenance transaction 415 chain linking all artifacts created in the process. The information provided by the Credentialed Information Requestor 260 to the Information Issuer 220 is hashed to produce an authentication code which is added as attestation information into the administrative provenance transaction 415. Any additional information added by the Information Issuer 220 is separately hashed before adding the resultant hash code value to an administrative provenance transaction 325 using administrative provenance transaction 415 as the transaction input to create the transaction output 325.

This process is repeated for each separate and discrete item of information captured, hashed and written 410/322/332 to facilitate individual validation of each item (e.g. facial recognition hashed output) at the time the Credentialed Information Requestor/Presenter 260 requires validation by an inspector in the field. The Credential Administrator 230 creates 330 the Portable Information Container and writes 332 the Credentialed Information as collected in the Credentialed Information Master set 235. Administrative provenance transaction(s) 335 are posted by the Credential Administrator 230 to the Portable Information Container's appropriate Credentialed Information address using administrative provenance transaction 325 as the transaction input to create the transaction output 335. All transactions are digitally signed as part of strengthening the over-all provenance of the process.

To establish immutable blockchain recorded provenance between the wallets, the Credentialed Information Requestor 260 may write affirmation information 440 to the Portable Information Container 240 before the Remit 442 step where they receive the requested Credentialed Information 245. If required by the business scenario and supported by an existing blockchain Credential Information Requestor 260 container-wallet, the Credentialed Information Requestor 260 may also pair bond to the Portable Information Container wallet 240 by posting the provenance transaction 445. At this point, the Credentialed Information Requestor 260 can present their Credentialed Information 245 for verification to an inspector which never need query the Issuer 220 or their Administrator 230 in order to execute validation.

Typical use case scenarios covered by this topology are, but not limited to, driver's licenses, passports, voter id, insurance cards, medical alert profile, employee badges and intellectual property like patents, copyrights and trademarks.

Exemplar Implementation of Voter Identity, Balloting and Vote Casting Systems

Electronic voting systems may well require authorized digital identification credentials along with additional requirements of personal voter self-audit, aggregated vote count transparency and voter privacy protection of identity and/or votes cast. The ballot upon which votes are applied may well be represented by the preferred embodiment as container-wallet secured information content where blockchain administrative provenance transaction sent from the voter's held digital voter identity container-wallet to the blockchain target address associated with the ballot initiative direction (e.g. Yea or Nay) or that of a candidate. For example, an administering election committee container-wallet generates a cryptographically derived container-wallet representing a specific election in time.

The activating provenance transaction is posted to the election container-wallet base administrative address. A child address is created for each candidate or measure adding the associated information content to the address label followed by a hash code embedded attestation and activation transactions. Each voter, via an application interface, posts their vote transaction to the address of their selected choice. The vote transactions are digitally signed by the voter employing the inherently embedded container-wallet PKI keys. Utilizing the preferred embodiment enables for various architectures to achieve the specific goals of an application. Another possible voting system design may choose instead to create a container-wallet for each ballot measure or for each candidate as a means of isolating each unto its own.

401 Solicited Credentialed Information Proxy Issuance

FIG. 4-1 is a flow diagram nearly identical to that of FIG. 4-0 except that the Credentialed Information (Proxy) 245 written/copied 332 by the Credential Administrator 230 to the Portable Information Container 240 contains a reference link to external Remote Content/Data 250. Use case scenarios covered by this preferred embodiment include, but not limited to, intellectual property licenses, resource access tokens, cloud micro-service API's, and windowed medical records access.

See FIG. 3-0 for additional detail on the operating model for Remote Content/Data Proxy issuance.

Lifecycle Administration of Credentialed Information

The preferred embodiment specifies methods to administer the lifecycle of information content and resource access control. Remote access via a Portable Information Container's 240 Credentialed Information (Proxy) 245 may be governed, as with any information content residing within a container-wallet at a resident address. Such governance may utilize "grant" and "revocation" signals sent as administrative blockchain transactions 335 to the address where the gateway function or program interface is persisted. Restrictions on the number of times a remote resource may be accessed or a temporal window can be prescribed in like manner using blockchain transaction signals.

Because access restrictions may be implemented as signals transparently visible in blockchain transactions, their enforcement is available to both the client's executing program, as well as, the remote information-content brokering service. Lifecycle administration of credentialed information-content status events may include, but is not limited to, CredentialInitiated, CredentialActivated, CredentialSuspended, Credential Deprecated, Credential Deactivated and InformationContentVersioned. Such signal nomenclature may be application specific or adheres to open standards (e.g. BPEL: Business Process Execution Language). This preferred embodiment does not stipulate the specific terminology or domain of representative values but instead specifies the framework for recording and discovering such control signals in a distributed environment yet providing for privacy if so required. Such signals direct processing application behavior in regards to information content access.

A Distributed Application Framework and Platform

The use of the blockchain client wallet as a foundation for a distributed application platform provides an inherent cross language and operating system agnostic programming model, program library and application container to encapsulate credentialed information, cryptographic services and blockchain transaction messaging oriented operations. Prior art often treats information security and communications as separate silos of functionality especially with regard to application and host platform containers. This embodied invention, on the other hand, treats security, through cryptographic functions, and civilization scale communications integration as the platform container within which all information and application contexts abide.

These native blockchain client provided facilities include, but is not limited to, blockchain client wallet container creation, blockchain client wallet resident account address creation represented as public-private key pairs, and, in a preferred embodiment, a BIP-32 Hierarchical Deterministic (HD) container-wallet enabled chain of authority replacing registries with blockchain query validation. Blockchain transactions used in the preferred embodiment may support added security features enforcing m of n digital signatures (BIP-11) needed to execute outbound transactions as a means of conveying processing instruction signals. As a result, blockchain transactions may arrive to an address having one or more verifiable digital signatures associated with metadata/reference data and/or processing instructions. When using the Bitcoin core blockchain client wallet application programming interface (API) as a reference implementation, all of the facilities and functionality inherently exposed form the foundation upon which this invention builds. The preferred embodiment elevates the blockchain client container-wallet as the host and gateway to access credentialed information content of all types including executable programmatic services. The preferred embodiment leverages immutable blockchain transactions and in-built public key infrastructure for credentialed information issuance, processing and all aspects of cryptographic operations.

500 Multi-Lateral Credentialed Information Issuance

FIG. 5-0 is a flow diagram which is an extension of the FIG. 4-0 Solicited Embedded Credential Information Issuance with the added complexity of dual mirror paths towards the creation of a single Portable information Container of Credentialed Information fulfilling the business objectives of multiple parties in a multi-lateral scenario. The most basic form of this model manifest in a bi-lateral contractual agreement where both Credential Information Requestors are participants in shaping the final output. In a contractual agreement scenario, there may often exist two or more Information Issuers 220, two or more Credential Administrator 230, each from their respective organizations collaborating to produce a single Credentialed Information artifact. Typical use case scenarios covered by this topology are, but not limited to, multi-lateral contracts, marriage licenses, divorce certificates, loans, swaps, and credit issuance.

600 Credentialed Information Integrated Validation

FIG. 6-0 is a flow diagram of an example Credentialed Information Integrated Validation process to verify provenance attestation binding to the Credentialed Information Issuer executing cryptographic operations and blockchain distributed ledger queries packaged and deployed for authorized reuse by an information issuer as part of a Credentialed Information Validator micro-service or programmatic function within the same Portable Information Container as the Credentialed Information in accordance with aspects of the invention. The content issuer provides executable programmatic content validation instructions as related content at a different blockchain address within the same portable information container-wallet. As with the content itself, the executable validation program is also signed and sealed with issuance attestation and blockchain transaction recorded provenance.

The Credentialed Information Presenter 260 provides to an Information Inspector 610 Input 605 of the Portable Information Container 240 with the address of the embedded Credentialed Information &245 and the address of the Credentialed Information Validator &645 program. The Information Inspector 610 verifies the authenticity of the Credentialed Information Validator 645 program which in turn validates the Credentialed Information 245. In the scenario where the Credentialed Information Presenter 260 requires additional comparative validation such as with identity authentication, the Information Inspector 610 must compare the Input 605 locally captured biometrics Optional Data To Compare 607 (e.g. facial picture, voice print, fingerprint, retinal scan, etc.) of the Credentialed Information Presenter 260 to the biometric data stored as Credentialed Information 245 by the Information Issuer 220.

The information inspector 610 retains knowledge of the Root Authority (RA) 210 parent of the Information Issuer 220. For example, the Central State Government may be the designated Root Authority (RA) 210 of regional statewide Department of Motor Vehicles (DMV) Information Issuers 220 distributing digital license and identifier Credentialed Information 245 embedded within Portable Information Containers (PIC) 240. The top level DMV agency serving as a second tier Root Authority (RA) 210 below the State Government Root Authority (RA) 210 may select to issue the standardized Credentialed Information Validator 645 supporting the Credentialed Information 245 validation for all distributed digital licenses and identities across all regional DMV office Information Issuers 220.

The Credentialed Information Presenter 260 provides the Input 605 Portable Information Container 240 with the address &245 of the embedded Credentialed Information 245 and the address &645 of the Credentialed Information Validator 645 to the Information Inspector 610. The Information Inspector 610 will Query Validator Provenance and Attestation Transactions (&645) 611 from the Blockchain Distributed Ledger 188 to Verify Validator Integrity (&645) 612. The Verify Validator Integrity (&645) 612 routine compares the presented Portable Information Container 240 (address) hash with that of the known Root Authority (RA) 210 to verify the Hierarchical Deterministic Wallet (HDW) derivation lineage. The Information Inspector 610 verifies the Credentialed Information Validator 645 was stored by an entity in the Root Authority (RA) 210 issuance lineage by back tracing the provenance transactions up the source issuance chain. The Information Inspector 610 verifies the Credentialed Information's 240 untampered program content integrity by comparing the hash based authentication code (e.g. HMAC) embedded within the attestation transaction sent to the Credentialed Information Validator 640 address &640 with the hash of the presented Credentialed Information Validator 645 content stored at the address &645 within the Portable Information Container (PIC) 240.

Having authenticated the Credentialed Information Validator 645, the Information Inspector 610 validates the Credentialed Information's 245 untampered data content integrity invoking an Exec Validator 613 function which inspects the Credentialed Information 245 by first invoking a Query Credentialed Information Transaction Provenance and Attestation (&245) 614 routine to retrieve the associated attestation and provenance administrative transactions from the Blockchain Distributed Ledger 188. The Credentialed Information Validator 645 next invokes a Get Info (&245) routine to retrieve the Credentialed Information 245. The Credentialed Information Validator 645 uses the administrative provenance and attestation transactions to back trace authenticate the provenance between the Information Issuer 220 and the Portable Information Container 240. Likewise, the Credentialed Information Validator 645 validates the untampered content attestation of the Credentialed Information 245 using the hash-based message authentication code (e.g. HMAC) embedded within the administrative provenance and attestation transaction to compare with the output of hashing the Credentialed Information content.

Optionally, if required to compare presented real time captured information content for validation, including but not limited to real time scanned biometrics output or real time in memory machine state scan output where malicious code injection may have occurred, the Information Inspector 610 also compares the hash of the (Input 605 Optional Data To Compare 607 of the Credentialed Information Presenter 260) with the blockchain attestation transaction contained hash code and the re-hashed code output of the data stored as Credentialed Information 245. Essentially, the preferred embodiment of this invention may provide for three hash code comparisons to validate the hash code of real time captured information content and stored information content is equivalent to the original attestation transaction recorded hash code. The Information Inspector 610 invokes the Exec Validator 613 function of the Credentialed Information Validator 645. The great advantage and novelty of the preferred embodiment is the ability to validate the provenance and untampered content attestation of any portably stored content locally at the edge of the network where interactive transactions occur without requiring a central registry or verification service. Additional value provided by the preferred embodiment of this invention is the ability to likewise locally validate data captured at point of contact with that which is stored in the Portable Information Container as seen above with biometrics based authentication of a presented digital identity.

601 Credentialed Information Segregated Validation

FIG. 6-1 is a flow diagram of an example Credentialed Information Segregated Validation process to verify provenance attestation binding to the Credentialed Information Issuer executing cryptographic operations and blockchain distributed ledger queries packaged and deployed for authorized reuse by an information issuer as part of a Credentialed Information Validator micro-service or programmatic function in a separate Portable Information Container from that of the Credentialed Information as may be found in a competitive marketplace in accordance with aspects of the invention.

The Credentialed Information Presenter 260 provides to an Information Inspector 610 Input 605 of the Portable Information Container 240 with the address of the embedded Credentialed Information &245 and the Portable Information Validation Container 640 with the address of the Credentialed Information Validator &645 program. The Information Inspector 610 verifies the authenticity of the Credentialed Information Validator 645 program which in turn validates the Credentialed Information 245. In the scenario where the Credentialed Information Presenter 260 requires additional comparative validation such as with identity authentication, the Information Inspector 610 must compare the Input 605 locally captured biometrics Optional Data To Compare 607 (e.g. facial picture, voice print, fingerprint, retinal scan, etc.) of the Credentialed Information Presenter 260 to the biometric data stored as Credentialed Information 245 by the Information Issuer 220.

The information inspector 610 retains knowledge of the Root Authority (RA) 210 parent of the Information Issuer 220. For example, the Central State Government may be the designated Root Authority (RA) 210 of regional statewide Department of Motor Vehicles (DMV) Information Issuers 220 distributing digital license and identifier Credentialed Information 245 embedded within Portable Information Containers (PIC) 240. The top level DMV agency serving as a second tier Root Authority (RA) 210 below the State Government Root Authority (RA) 210 may select to issue the standardized Credentialed Information Validator 645 supporting the Credentialed Information 245 validation for all distributed digital licenses and identities across all regional DMV office Information Issuers 220. In the Credentialed Information Segregated Verification, the Credentialed Information Validator 645 is embedded within its own Portable Information Validator Container 640 separate from the Credentialed Information 245 yet connected through their container HDW cryptographic lineage and provenance transactions originating from a shared Information Issuer 220/Root Authority 210 lineage.

The Credentialed Information Presenter 260 provides to the Information Inspector 610 the Input 605 Portable Information Container 240 with the address &245 of the embedded Credentialed Information 245 and the Portable Information Validation Container 640 with the address &645 of the Credentialed Information Validator 645. The Information Inspector 610 will Query Validator Provenance and Attestation Transactions (&645) 611 from the Blockchain Distributed Ledger 188 to Verify Validator Integrity (&645) 612. The Verify Validator Integrity (&645), 612 routine compares the presented Portable Information Validation Container 640 (address) hash with that of the known Root Authority (RA) 210 to verify the Hierarchical Deterministic Wallet (HDW) derivation lineage. The Information Inspector 610 verifies the Credentialed Information Validator 645 was stored by an entity of the Root Authority (RA) 210 issuance lineage by back tracing the provenance transactions up the source issuance chain. The Information Inspector 610 verifies the Credentialed Information Validator's 645 untampered program content integrity by comparing the hash based authentication code (e.g. HMAC) embedded within the attestation transaction sent to the Credentialed Information Validator 640 address &640 with the hash of the presented Credentialed Information Validator 645 content stored at the address &645 within the Portable Information Validation Container 640.

Having authenticated the Credentialed Information Validator 645, the Information Inspector 610 validates the Credentialed Information's 245 untampered data content integrity invoking an Exec Validator 613 function which inspects the Credentialed Information 245 by first invoking a Query Credentialed Information Transaction Provenance and Attestation (&245) 614 routine to retrieve the associated attestation and provenance administrative transactions from the Blockchain Distributed Ledger 188. The Credentialed Information Validator 645 next invokes a Get Info (&245) routine to retrieve the Credentialed Information 245. The Credentialed Information Validator 645 uses the administrative provenance and attestation transactions to back trace authenticate the provenance between the Information Issuer 220 and the Portable Information Container 240. Likewise, the Credentialed Information Validator 645 validates the untampered content attestation of the Credentialed Information 245 using the hash based message authentication code (e.g. HMAC) embedded within the administrative provenance and attestation transaction to compare with the output of hashing the Credentialed Information 245 content.

Optionally, if required to compare presented real time captured information content for validation, including but not limited to real time scanned biometrics output or real time in memory machine state scan output where malicious code injection may have occurred, the Information Inspector 610 also compares the hash of the (Input 605 Optional Data To Compare 607 of the Credentialed Information Presenter 260) with the blockchain attestation transaction contained hash code and the re-hashed code output of the data stored as Credentialed Information 245. Essentially, the preferred embodiment of this invention may provide for three hash code comparisons to validate the hash code of real time captured information content and stored information content is equivalent to the original attestation transaction recorded hash code. The Information Inspector 610 invokes the Exec Validator 613 function of the Credentialed Information Validator 645. The great advantage and novelty of the preferred embodiment is the ability to validate the provenance and untampered content attestation of any portably stored content locally at the edge of the network where interactive transactions occur without requiring a central registry or verification service. Additional value provided by the preferred embodiment of this invention is the ability to likewise locally validate data captured at point of contact with that which is stored in the Portable Information Container as seen above with biometrics based authentication of a presented digital identity.

CONCLUSION

The enablements described in detail above are considered novel over prior art of record and are considered critical to the operation of at least one aspect of the system and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

CITATIONS

1. Bitcoin Core: https://bitcoin.org/en/bitcoin-core/
2. Bitcoin Improvement Proposal: BIP-011 M-of-N Standard Transactions: https://github.com/bitcoin/bips/blob/master/bip-0011.mediawiki
3. Bitcoin Improvement Proposal: BIP-032 Hierarchical Deterministic Wallets ("HD Wallets"): https://github.com/bitcoin/bips/blob/master/bip-0032.mediawiki
4. Bitcoin Improvement Proposal: BIP-044 Multi-Account Hierarchy For Deterministic Wallets: https://github.com/bitcoin/bips/blob/master/bip-0044.mediawiki
5. Bitcoin Improvement Proposal: BIP-065 OP_CHECKLOCKTIMEVERIFY: https://github.com/bitcoin/bips/blob/master/bip-0065.mediawiki
6. Bitcoin Improvement Proposal: BIP-068 Relative locktime using consensus-enforced sequence numbers: https://github.com/bitcoin/bips/blob/master/bip-0068.mediawiki
7. Bitcoin Improvement Proposal: BIP-112 CHECKSEQUENCEVERIFY: https://github.com/bitcoin/bips/blob/master/bip-0112.mediawiki
8. U.S. Pat. No. 7,694,121B2: System and method for protected operating system boot using state validation: https://patents.google.com/patent/U.S. Pat. No. 7,694,121B2/en

The invention claimed is:

1. A non-transitory computer-readable storage medium having stored thereon executable instructions that, as a result of being executed by a processor of a computer system, cause the computer system to at least perform the steps supporting normative Bitcoin Core blockchain medium:
   instructions for loading and executing Bitcoin Core complaint blockchain distributed ledger technology libraries and network communications;
   instructions for synchronizing blockchain distributed transaction ledger node instances with the network;
   instructions for creating Bitcoin Core compliant standard and Hierarchical Deterministic Wallet (HDW) containers;
   instructions for creating Bitcoin Core compliant standard and Hierarchical Deterministic (HD) Keys;
   instructions for copying Bitcoin Core compliant standard and Hierarchical Deterministic Wallet (HDW) containers;
   instructions for creating Bitcoin Core compliant hierarchical deterministic Wallet (HDW) containers;
   instructions for creating Bitcoin Core compliant blockchain wallet accounts and addresses with associated public and private key pairs as defined by the Public Key Infrastructure (PKI) standard;
   instructions for storing information content within a blockchain wallet container in association with a generated account address;
   instructions for reading information content within a blockchain wallet container in association with a generated account address;
   instructions for querying the blockchain transaction ledger;
   instructions for inspecting the contents of blockchain transaction output;
   instructions for creating blockchain transactions;
   instructions for embedding application specific information within blockchain transaction output;
   instructions for posting transactions to the blockchain network;
   instructions for accessing public and private key pairs associated with blockchain wallet addresses;
   instructions for executing blockchain cryptographic operations;
   instructions for digitally signing blockchain transactions;
   instructions for validating a digital signature of blockchain transactions;
   instructions for digitally signing information content;
   instructions for validating a digital signature of information content;
   instructions for executing blockchain cryptographic hashing operations of digital information content;
   instructions for executing blockchain cryptographic operations to validate the relationship lineage of Hierarchical Deterministic (HD) key and Hierarchical Deterministic Wallet (HDW) provenance.

2. The non-transitory computer-readable storage medium of claim 1, having stored thereon executable instructions that, as a result of being executed by a processor of a computer system, store information content within a blockchain wallet container in association with a generated account address further comprises:
   instructions for associating blockchain wallet container addresses as idem potent identifiers for information content stored inside the blockchain wallet container; and
   instructions for associating blockchain wallet addresses as idem potent identifiers of resolvable location linked references stored inside a blockchain wallet container referencing information content stored outside a blockchain wallet container.

3. The non-transitory computer-readable storage medium of claim 1, having stored thereon executable instructions that, as a result of being executed by a processor of a computer system stores information content within a blockchain wallet container in association with a generated account address further comprises:
   instructions for validating presented information content issuance provenance and attestation credentials to verify no modifications have occurred since last stored/persisted by the information issuer or the designated proxy administrator;
   instructions for storing information content hash code value(s) within blockchain administrative provenance and attestation transactions posted to the blockchain distributed transaction ledger with a target destination of the blockchain wallet container address associated with the stored or referenced information content; and
   instructions for reading information content hash code value(s) within blockchain administrative provenance and attestation transactions posted to the blockchain distributed transaction ledger with a target destination of the blockchain wallet container address associated with the stored or referenced information content.

4. The non-transitory computer-readable storage medium of claim 1, having stored thereon executable instructions that, as a result of being executed by a processor of a computer system create Bitcoin Core compliant blockchain wallet accounts and addresses with associated public and private key pairs as defined by the Public Key Infrastructure (PKI) standard further comprises:
   instructions for leveraging blockchain wallet resident addresses to manage the associated PKI keys specifically utilized with information content stored at the address for cryptographic operations including at least one of encryption, decryption and establishing secure network communications channels.

5. The non-transitory computer-readable storage medium of claim 3, having stored thereon executable instructions that, as a result of being executed by a processor of a computer system read information content hash code value (s) within blockchain administrative provenance and attestation transactions posted to the blockchain distributed transaction ledger with a target destination of the blockchain wallet container address associated with the stored or referenced information content further comprises:
   instructions to validate information content integrity as unaltered by inspecting and comparing for equivalency the attestation hash code output of information content as originally stored embedded within blockchain provenance and attestation transactions with the real time executed hash code output of inspected information content stored in the wallet container at the attestation transaction target address and/or optionally compared with non-persisted real time captured information content hash code;
   instructions for on demand real time identity validation by comparing the hash code of credentialed information presenter scanned biometrics information content to the attestation transaction stored hash code and/or the hash code of the presented stored information content; and
   instructions to detect in memory virus or malware injection by comparing the hash code of presented real time scanned machine state information content to the attestation transaction stored hash code and/or the hash code of the presented stored information content representing the last known good state of the machine memory manifest.

6. The non-transitory computer-readable storage medium of claim 3, having stored thereon executable instructions that, as a result of being executed by a processor of a computer system stores information content hash code value(s) within blockchain administrative provenance and attestation transactions posted to the blockchain distributed transaction ledger with a target destination of the blockchain wallet container address associated with the stored or referenced information content further comprises:

instructions for embedding in blockchain transactions as remote application processing instruction signals posted and syndicated to all instance copies of the target wallet container at the resident information content associated address;

instructions for embedding information content lifecycle administration signals in blockchain transaction output posted and syndicated to all instance copies of the target wallet container resident information content associated address including at least one of setting or changing content status to active, deprecated/expired, suspended or any application specific status value;

instructions for remote content validators to inspect and adhere to application processing directives, information content lifecycle administration and operational signals; and instructions interpreted by processing applications by mapping the PKI key used for the administrative transaction's digital signature as associated with reference data stored at the digital signature PKI Key associated address augmenting the use of transaction embedded instructions.

7. The non-transitory computer-readable storage medium of claim 6, having stored thereon executable instructions that, as a result of being executed by a processor of a computer system embeds in blockchain transactions as remote application processing instruction signals posted and syndicated to all instance copies of the target wallet container at the resident information content associated address further comprises:

instructions interpreted by processing applications by mapping the PKI key used for the administrative transaction's digital signature as associated with reference data stored at the digital signature PKI Key associated address augmenting the use of transaction embedded instructions.

8. The non-transitory computer-readable storage medium of claim 6 having stored thereon executable instructions that, as a result of being executed by a processor of a computer system provide remote content validators the capability to inspect and adhere to remote application processing further comprises:

instructions for issuing distributed digital resource access control tokens which expire by administrative action, metered usage, conditionally or after a specified duration of time without need for a central registry or repository to be enforced by remote resource controllers.

9. The non-transitory computer-readable storage medium of claim 6, having stored thereon executable instructions that, as a result of being executed by a processor of a computer system embeds in blockchain transactions remote application processing instruction signals posted and syndicated to all instance copies of the target wallet container resident information content associated address further comprises:

Instructions to "Phone home" by sending processing instructions to all instance copies of the target remote wallet container address to initiate PKI secured connections to retrieve and store locally information content as a means of managed request initiated content distribution.

10. The non-transitory computer-readable storage medium of claim 7, having stored thereon executable instructions that, as a result of being executed by a processor of a computer system, dispatches instructional signals to "Phone home" by sending processing instructions to all instance copies of the target remote wallet container address to initiate PKI secured connections to retrieve and store locally information content as a means of managed request initiated content distribution further comprises:

instructions for instance copy inventory management and control to constrain the when, by whom and how many copies of information content are created by combining "Phone Home" inventory directive, access control and processing signals to authorize uniquely identified idem potent managed copies.

11. The non-transitory computer-readable storage medium of claim 9, having stored thereon executable instructions that, as a result of being executed by a processor of a computer system, provides for instance copy inventory control and management further comprises:

instructions for distributed instance targeted information content versioning and amendment distribution.

\* \* \* \* \*